(12) United States Patent
Takada et al.

(10) Patent No.: US 11,226,719 B2
(45) Date of Patent: Jan. 18, 2022

(54) INFORMATION PROCESSING DEVICE

(71) Applicant: CLARION CO., LTD., Saitama (JP)

(72) Inventors: Shintaro Takada, Tokyo (JP); Takashi Matsubara, Tokyo (JP); Naoki Mori, Tokyo (JP)

(73) Assignee: CLARION CO., LTD., Saitama (JP)

( * ) Notice: Subject to any disclaimer, the term of this patent is extended or adjusted under 35 U.S.C. 154(b) by 173 days.

(21) Appl. No.: 15/314,259

(22) PCT Filed: Jul. 2, 2015

(86) PCT No.: PCT/JP2015/069101
§ 371 (c)(1),
(2) Date: Nov. 28, 2016

(87) PCT Pub. No.: WO2016/002872
PCT Pub. Date: Jan. 7, 2016

(65) Prior Publication Data
US 2017/0192629 A1 Jul. 6, 2017

(30) Foreign Application Priority Data
Jul. 4, 2014 (JP) .............................. JP2014-138237

(51) Int. Cl.
*G06F 3/0482* (2013.01)
*G06F 3/0484* (2013.01)
(Continued)

(52) U.S. Cl.
CPC ............ *G06F 3/0482* (2013.01); *B60K 35/00* (2013.01); *G06F 3/017* (2013.01); *G06F 3/0304* (2013.01);
(Continued)

(58) Field of Classification Search
CPC ...... G06F 3/0482; G06F 3/017; G06F 3/0304; G06F 3/04842; G06F 3/0487;
(Continued)

(56) References Cited

U.S. PATENT DOCUMENTS

| | | | |
|---|---|---|---|
| 10,564,731 B2 * | 2/2020 | Bell ........................ | G01B 11/14 |
| 2005/0063564 A1 * | 3/2005 | Yamamoto .......... | B60R 25/2045 382/104 |

(Continued)

FOREIGN PATENT DOCUMENTS

| | | |
|---|---|---|
| JP | 2005174356 | 6/2005 |
| JP | 2009-265709 A | 11/2009 |

(Continued)

OTHER PUBLICATIONS

Partial Supplementary European Search Report dated Feb. 12, 2018 for the European Application No. 15815182.9.
(Continued)

*Primary Examiner* — Sherief Badawi
*Assistant Examiner* — Koorosh Nehchiri
(74) *Attorney, Agent, or Firm* — Volpe Koenig

(57) ABSTRACT

An information processing device, includes: a gesture detection unit that recognizes gestures by a user; an output information control unit that controls output information to a display unit; and a device control unit, wherein: if the gesture detection unit has detected that the user has raised a hand for a certain time period, then the output information control unit displays upon the display unit a plurality of candidates for selection in association with gestures for operation; and if the gesture detection unit has detected a predetermined gesture by the user, the device control unit considers that, among the candidates for selection displayed upon the display unit, a candidate corresponding to the gesture that has been detected has been selected.

7 Claims, 41 Drawing Sheets

(51) Int. Cl.
  *G06F 3/0487*    (2013.01)
  *G06F 3/03*      (2006.01)
  *B60K 35/00*     (2006.01)
  *G06F 3/01*      (2006.01)
  *G06F 3/0488*    (2013.01)
  *G06F 3/16*      (2006.01)

(52) U.S. Cl.
  CPC .......... *G06F 3/0487* (2013.01); *G06F 3/0488* (2013.01); *G06F 3/04842* (2013.01); *G06F 3/167* (2013.01); *B60K 2370/146* (2019.05); *B60K 2370/195* (2019.05); *B60K 2370/52* (2019.05); *B60K 2370/73* (2019.05)

(58) Field of Classification Search
  CPC ....... G06F 3/0488; G06F 3/167; B60K 35/00; B60K 2350/1052; B60K 2350/352; B60K 2350/90; B60K 2350/906; B60W 40/00; B60W 50/08
  USPC ......................................................... 715/863
  See application file for complete search history.

(56) References Cited

U.S. PATENT DOCUMENTS

| | | | | |
|---|---|---|---|---|
| 2006/0139314 | A1* | 6/2006 | Bell | G06F 3/0425 345/156 |
| 2009/0027337 | A1 | 1/2009 | Hildreth | |
| 2009/0082951 | A1* | 3/2009 | Graessley | G01C 21/3617 701/532 |
| 2009/0100383 | A1* | 4/2009 | Sunday | G06F 3/04883 715/863 |
| 2009/0103780 | A1* | 4/2009 | Nishihara | G06F 3/017 382/103 |
| 2009/0217211 | A1 | 8/2009 | Hildreth et al. | |
| 2009/0262187 | A1* | 10/2009 | Asada | G06F 3/017 348/77 |
| 2010/0060576 | A1* | 3/2010 | Underkoffler | G06F 3/017 345/158 |
| 2010/0199221 | A1* | 8/2010 | Yeung | A63F 13/213 715/850 |
| 2010/0210359 | A1* | 8/2010 | Krzeslo | A63F 13/213 463/31 |
| 2010/0306713 | A1* | 12/2010 | Geisner | G06F 3/04847 715/863 |
| 2011/0119640 | A1* | 5/2011 | Berkes | G06F 3/017 715/863 |
| 2011/0218696 | A1* | 9/2011 | Okada | G01C 21/36 701/1 |
| 2012/0119985 | A1 | 5/2012 | Kang | |
| 2012/0176232 | A1* | 7/2012 | Bantz | G07C 5/008 340/439 |
| 2012/0235904 | A1* | 9/2012 | Plagemann | G06F 3/017 345/158 |
| 2012/0287044 | A1* | 11/2012 | Bell | G06K 9/00335 345/158 |
| 2013/0225999 | A1* | 8/2013 | Banjanin | A61B 8/467 600/443 |
| 2013/0260884 | A1* | 10/2013 | Challinor | G06F 3/011 463/31 |
| 2013/0261871 | A1* | 10/2013 | Hobbs | B60K 37/06 701/28 |
| 2013/0265226 | A1 | 10/2013 | Park et al. | |
| 2013/0271360 | A1* | 10/2013 | MacDougall | H04M 1/72519 345/156 |
| 2014/0089849 | A1* | 3/2014 | Choi | G06F 3/017 715/810 |
| 2014/0172231 | A1* | 6/2014 | Terada | G06F 3/005 701/36 |
| 2014/0270382 | A1* | 9/2014 | Cheng | G06K 9/00355 382/104 |
| 2014/0282161 | A1* | 9/2014 | Cash | G06F 3/017 715/769 |
| 2014/0309878 | A1* | 10/2014 | Ricci | H04L 51/02 701/36 |
| 2015/0099495 | A1* | 4/2015 | Crosbie | B60W 50/14 455/414.3 |
| 2017/0131395 | A1* | 5/2017 | Reynolds | G01S 7/415 |
| 2020/0057783 | A1* | 2/2020 | Ricci | G06F 16/583 |

FOREIGN PATENT DOCUMENTS

| | | |
|---|---|---|
| JP | 2010-215194 A | 9/2010 |
| JP | 2011-116304 A | 6/2011 |
| JP | 2014-119295 A | 6/2014 |
| WO | 2008/149482 A | 12/2008 |
| WO | 2013/158433 A1 | 10/2013 |

OTHER PUBLICATIONS

Office Action in JP counterpart Application No. 2014-138237 dated Oct. 24, 2017.
Communication pursuant to Article 94(3) EPC dated Aug. 27, 2019 for the European Patent Application No. 15815182.9.

* cited by examiner

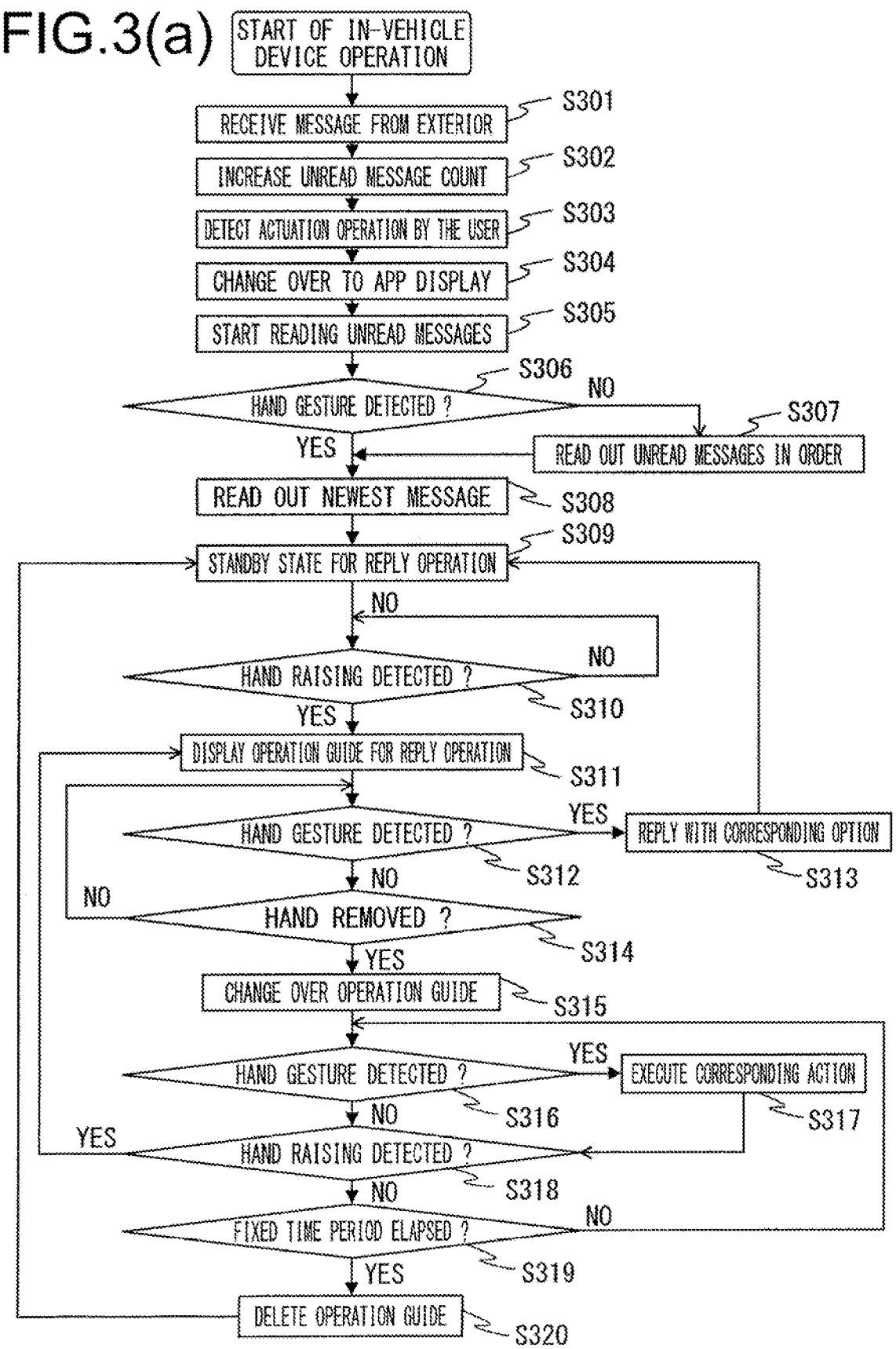

FIG.8(b)

| LOCK POSITION | 103A | 103B | 103C |
|---|---|---|---|
| START OPERATION | REPLY WITH STICKER | STANDARD REPLY | COMPOSE REPLY |

FIG.11(b)

| DISPLAY | HUD | DIAL DISPLAY | CENTER DISPLAY |
|---|---|---|---|
| INSTALLATION POSITION | WINDSHIELD | DIALS | CENTER DISPLAY |
| CONNECTION STATE | ○ | ○ | ○ |
| PRIORITY LEVEL | 1 | 2 | 3 |

FIG.11(c)

| DISPLAY | HUD | SMART PHONE | DIAL DISPLAY | CENTER DISPLAY |
|---|---|---|---|---|
| INSTALLATION POSITION | WINDSHIELD | FRONT PORTION | DIALS | CENTER DISPLAY |
| CONNECTION STATE | × | ○ | ○ | ○ |
| PRIORITY LEVEL | — | 1 | 2 | 3 |

FIG.14(a)

OPERATING MEANS THAT CAN OR CANNOT BE USED FOR VARIOUS DRIVING BURDEN LEVELS

| OPERATING MEANS | DRIVING BURDEN | | | |
|---|---|---|---|---|
| | NONE | LOW | MEDIUM | HIGH |
| HAND WAVING GESTURE | ○ | ○ | ○ | × |
| HAND RAISING | ○ | ○ | × | × |
| (AFTER HAND RAISING) GESTURE | ○ | ○ | × | × |
| OPTION SELECTION BY SWITCH OPERATION | ○ | ○ | ○ (ONLY DURING OPERATION) | × |
| OPTION SELECTION BY VOICE RECOGNITION | ○ | ○ | ○ (ONLY DURING OPERATION) | × |
| REPLY COMPOSITION BY VOICE RECOGNITION | ○ | ○ | ○ | × |

FIG.14(b)

DETAILS PRESENTED VIA CENTER DISPLAY

|  |  | DRIVING BURDEN | | | |
|---|---|---|---|---|---|
|  |  | NONE | LOW | MEDIUM | HIGH |
|  | DURING MESSAGE DISPLAY AND READOUT | CALLER NAME AND MESSAGE | CALLER NAME ONLY | CALLER NAME ONLY | × |
|  | DURING REPLY OPERATION | DISPLAY OF OPTIONS | × | × | × |

APPLICATION STATE

FIG.14(c)

DETAILS PRESENTED VIA HUD

| | | DRIVING BURDEN | | | |
|---|---|---|---|---|---|
| | | NONE | LOW | MEDIUM | HIGH |
| | DURING MESSAGE DISPLAY AND READOUT | CALLER NAME ONLY | CALLER NAME ONLY | CALLER NAME ONLY | × |
| | DURING REPLY OPERATION | DISPLAY OF OPTIONS | DISPLAY OF OPTIONS | DISPLAY OF OPTIONS (ONLY DURING OPERATION) OPERATION PROHIBITED | × |

APPLICATION STATE

FIG.14(d)

| | | DETAILS PRESENTED VIA SPEAKER | | | |
|---|---|---|---|---|---|
| | | DRIVING BURDEN | | | |
| | | NONE | LOW | MEDIUM | HIGH |
| APPLICATION STATE | DURING MESSAGE DISPLAY AND READOUT | CALLER NAME & MESSAGE | CALLER NAME & MESSAGE | CALLER NAME & MESSAGE | WARNING SOUND |
| | DURING REPLY OPERATION | OPERATING SOUND | OPERATING SOUND | OPERATING SOUND | WARNING SOUND |

INFORMATION PROCESSING DEVICE

TECHNICAL FIELD

The present invention relates to an information processing device.

BACKGROUND ART

In PTL #1, an actuation device for an in-vehicle device is described that is capable of displaying a menu for actuation of the in-vehicle device and an image of the hand of the driver who is operating an actuation unit as superimposed upon a head up display (HUD), so that, by the driver being enabled to perform actuation while looking at this image, selection operation upon the in-vehicle device is simple and quick, and accordingly does not involve any hindrance to driving.

CITATION LIST

Patent Literature
PTL #1: Japanese Laid-Open Patent Publication 2010-215194.

SUMMARY OF INVENTION

Technical Problem
However, with the technique described in PTL #1, in such actuation of the in-vehicle device during driving, since a menu related to actuation is always displayed upon the HUD, accordingly there is a possibility that some hindrance to driving operation may be created.

Moreover, in order for actuation to be performed, it is necessary to install a dedicated device for actuation in some location within the vehicle, and, along with increase of the cost, various constraints arise related to installation, and this is not desirable. Furthermore, even if an interface that operates only by voice is employed, still it is necessary to allow some time for the processing required to recognize that voice, and it is necessary also to allow some time for the driver to listen to the voice that is being read out, so that the ease of use and the convenience are undesirably deteriorated.

Solution to Technical Problem
According to the 1st aspect of the present invention, an information processing device, includes: a gesture detection unit that recognizes gestures by a user: an output information control unit that controls output information to a display unit; and a device control unit, wherein: if the gesture detection unit has detected that the user has raised a hand for a certain time period, then the output information control unit displays upon the display unit a plurality of candidates for selection in association with gestures for operation; and if the gesture detection unit has detected a predetermined gesture by the user, the device control unit considers that, among the candidates for selection displayed upon the display unit, a candidate corresponding to the gesture that has been detected has been selected.

According to the 2nd aspect of the present invention, in the information processing device according to the 1st aspect, it is preferred that the device control unit receives a selection operation of a candidate according to a gesture of the user, even before the candidates for selection are displayed upon the display unit.

According to the 3rd aspect of the present invention, in the information processing device according to the 1st or 2nd aspect, it is preferred that if a plurality of the display units are provided, the output information control unit displays the plurality of candidates for selection upon a selected display unit for which it has been decided by the device control unit that, even if information is displayed, a driving behavior of the user will not be hampered.

According to the 4th aspect of the present invention, in the information processing device according to any one of the 1st through 3rd aspects, it is preferred that when the gesture detection unit has detected raising of the hand of the user, the device control unit changes a number of options displayed upon the display unit, and gesture actions corresponding to the options, according to an attitude in which the user has raised the hand.

According to the 5th aspect of the present invention, in the information processing device according to any one of the 1st through 4th aspects, it is preferred that the information processing device further comprises a storage unit that stores whether a vehicle to which the information processing device is installed is a left hand drive vehicle or a right hand drive vehicle, wherein: the device control unit changes a number of options displayed upon the display unit, and gesture actions corresponding to the options, according to information stored in the storage unit.

According to the 6th aspect of the present invention, in the information processing device according to any one of the 1st through 5th aspects, it is preferred that: the output information control unit, after having displayed the plurality of candidates for selection upon the display unit, if the gesture detection unit has detected that the user has ceased to raise the hand, causes a message showing that the candidates for selection can be changed and a display showing a gesture action corresponding to the message to be displayed; and the device control unit changes the candidates for selection, if the gesture detection unit has detected a gesture corresponding to the gesture operation displayed by the display unit.

According to the 7th aspect of the present invention, in the information processing device according to any one of the 1st through 6th aspects, it is preferred that the information processing device further comprises an external interface that acquires voice input from a voice recognition unit that is installed in a vehicle in which the information processing device is installed, or input related to switch operation from a switch operation unit, wherein: when the display unit displays the plurality of candidates for selection, the device control unit receives selection of an option by the voice recognition unit or by the switch operation unit.

According to the 8th aspect of the present invention, in the information processing device according to any one of the 1st through 7th aspects, it is preferred that the information processing device further comprises a detection unit that, from a plurality of methods of actuation, detects which actuation method the user intends to use for performing actuation, wherein: the device control unit changes a method for selecting options displayed upon the display unit, according to the actuation method detected by the detection unit.

According to the 9th aspect of the present invention, in the information processing device according to any one of the 1st through 8th aspects, it is preferred that the information processing device further comprises a driving burden estimation unit that estimates a driving burden upon the user, wherein: if the driving burden estimation unit has estimated that a prescribed level of driving burden is exceeded, the output information control unit does not display the candidates for selection upon detection of hand raising by the user.

According to the 10th aspect of the present invention, in the information processing device according to the 9th aspect, it is preferred that: when the candidates for selection are being displayed upon the display unit, and when the driving burden estimation unit estimates that the driving burden is at a predetermined level, the device control unit only receives selection operation by a specified actuation unit of a plurality of actuation units; and the output information control unit performs control so as to continue display of the candidates for selection until selection operation ends, or until a certain time period has elapsed.

According to the 11th aspect of the present invention, in the information processing device according to the 9th or 10th aspect, it is preferred that the output information control unit displays, upon the display unit, upon which of the actuation units actuation is currently effective.

Advantageous Effect of Invention

According to the present invention, it is possible to enhance the security and the ease of actuation of an in-vehicle device by a driver during driving.

BRIEF DESCRIPTION OF DRAWINGS

FIG. 3(a) An example of operational flow in the first embodiment.

FIG. 8(b) An example relating to operation according to the positions of sensing units.

FIG. 11(b) An example showing display locations for display details.

FIG. 11(c) Another example showing display locations for display details.

FIG. 14(a) An example of a control pattern corresponding to a level of driving burden.

FIG. 14(b) Another example of a control pattern corresponding to a level of driving burden.

FIG. 14(c) An example of a control pattern corresponding to a level of driving burden.

FIG. 14(d) An example of a control pattern corresponding to a level of driving burden.

DESCRIPTION OF EMBODIMENTS

Embodiments of the present invention will now be explained in detail with reference to the drawings.

Embodiment #1

Explanation of the Structure

Figure 1:
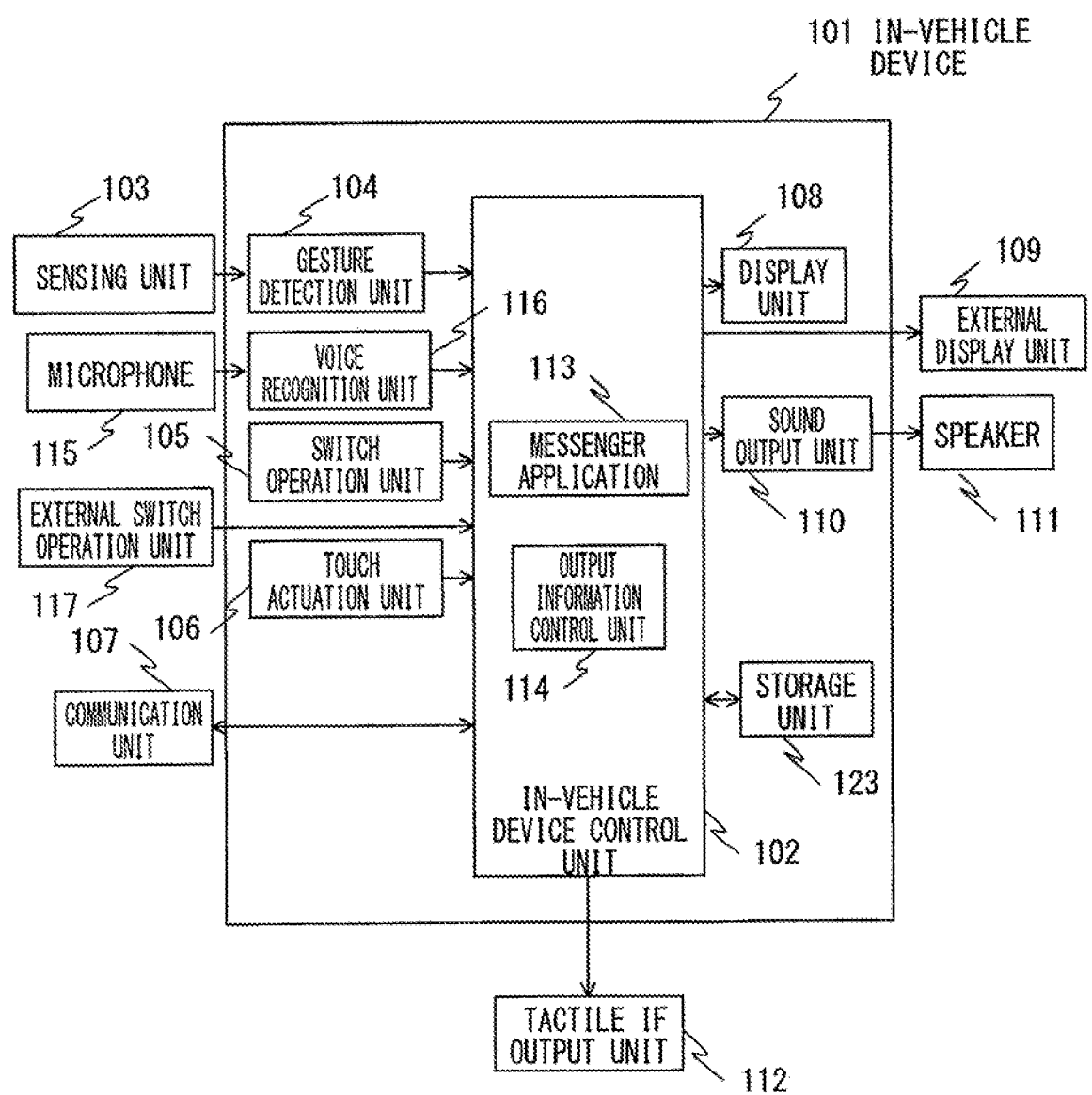
FIG. 1 A structural diagram of an in-vehicle device according to a first embodiment of the present invention.

FIG. 1 is a structural diagram of an in-vehicle device 101 according to this embodiment. An in-vehicle device control unit 102 is a section that controls the overall operation of this in-vehicle device 101, and that, by performing calculations according to programs stored in a storage unit 123 and related to a messenger application 113 and to an output information control unit 114, implements the functions of that messenger application 113 and that output information control unit 114. It should be understood that it would be possible to install applications other than those for the messenger application 113 and the output information control unit 114 in the in-vehicle device 101, and that it would be possible to store programs for these applications in the storage unit 123 during factory production, or for them to be stored in the storage unit 123 according to selection by the user, via a communication unit 107 or via an external connection IF not shown in the figures such as a USB connector or the like. Moreover, along with controlling the fundamental operation as a car navigation system, contents to be outputted are controlled on the basis of input information of various types.

A sensing unit 103 is a section that detects the distance between the hand of the user and one or more sensors and that also detects hand gestures by the user, and may, for example, include one or more sensors such as an infrared distance sensor, a laser distance sensor, an ultrasonic distance sensor, a distance image sensor, an electric field sensor, an image sensor or the like, a microcomputer that performs data processing, and software that runs upon the microcomputer. The sensors that are employed in the sensing unit 103 are not to be considered as being particularly limited, provided that they have the function of providing signals that can be used for detection of the distance to the hand of the user and for detecting his hand gestures.

On the basis of the sensor data obtained from the sensing unit 103, when the user raises his hand, a gesture detection unit 104 detects whether or not he has performed predetermined gestures that are stipulated in advance (for example, whether or not he has performed the hand gestures of waving his hand in the up, down, left, or right direction). For example, for detecting hand raising, the gesture detection unit 104 may detect whether or not some predetermined sensor value has continued for a specified period of time and, for detecting performance of a gesture, may analyze the difference in reaction times of the results of detection of the user's hand between a plurality of sensors.

A switch operation unit 105 is a hardware switching unit for performing actuation of the in-vehicle device: components such as press buttons, a jog dial, and so on may be mounted thereto.

A touch actuation unit 106 transmits coordinates at which it has been touched to the in-vehicle device control unit 102, so that actuation of the in-vehicle device is performed.

A microphone 115 performs acquisition of sound in the interior of the vehicle.

A voice recognition unit 116 converts voice from inputted voice data into a character code string.

The communication unit 107 inputs and outputs information of various types by connecting to an external network. For example, this may be input of information related to navigation, transmission and reception of messages, or the like.

An external switch operation unit 117 is a switch operation unit that is installed in some location separate from the in-vehicle device; this may be, for example, a steering switch that is installed near the steering wheel, a commander switch that is installed in a center console of the vehicle, or the like.

A display unit 108 is a device that presents image information to the user; for example, this may be a device that includes a display device such as a LCD (Liquid Crystal Display) or the like, a calculation processing device that is required for processing in order to display image contents and/or a GUI (Graphical User Interface) and so on, and a memory.

An external display unit 109 is a display that is installed in some location within the vehicle other than the in-vehicle device 101, and that displays images. For example, this unit may be a head up display (a HUD) that is installed in the direction forward of the driver's seat, or the like. A HUD is capable of displaying information of various types while remaining transparent to the scene in front of the driver (i.e. the user).

A sound output unit 110 is a section that outputs audio or voice.

A speaker 11 outputs the sound from the sound output unit 110.

A tactile IF output unit 112 is a section that transmits tactile information of some type to the user; for example, this unit may be built from an ultrasound array that comprises a plurality of ultrasound elements, and that transmits pressure to a space at any appropriate distance from the device. Or it would also be acceptable to provide a blower that provides a similar beneficial effect. Furthermore, it could be built as a vibrating element that is installed to the steering wheel or the like, so as to vibrate the steering wheel itself; in fact, this structural element is not to be considered as being particularly limited.

The messenger application 113 performs reception and delivery of message data together with the communication unit 107, stores messages that have been inputted, and performs control for output. Moreover, when a message is to be transmitted, it transmits this message to be transmitted to the communication unit 107.

And an output information control unit 114 controls the contents to be outputted to the display unit 108 or to the external display unit 109.

Figure 2A:
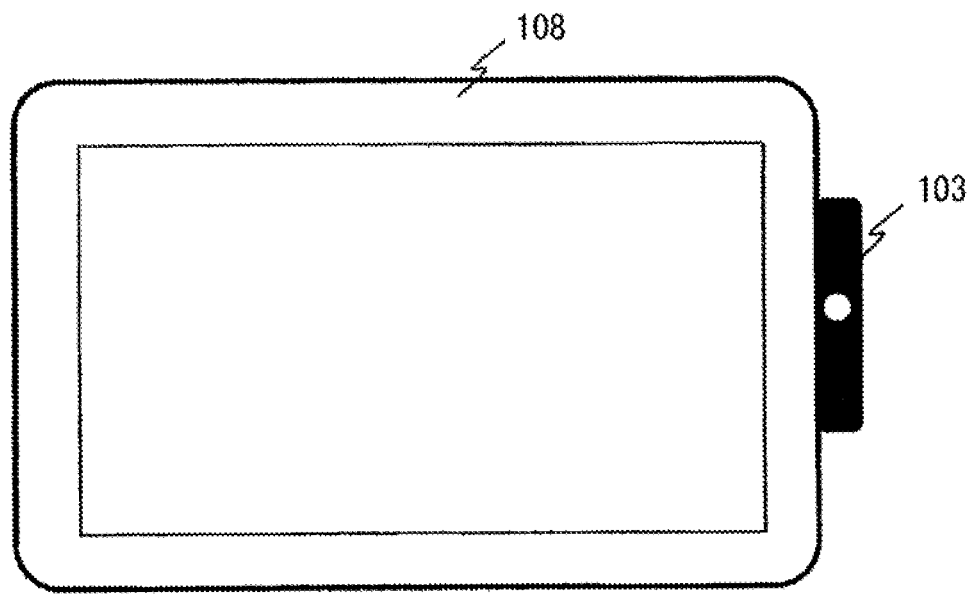
FIG. 2(a) An example of a position in which a sensing unit is installed.
Figure 2A:
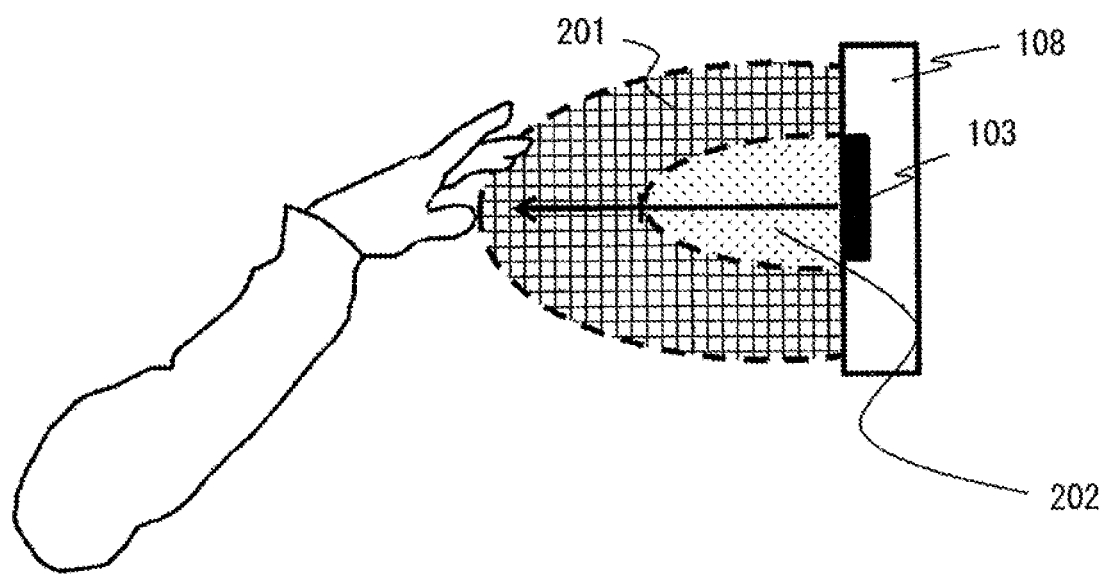
Figure 2B:
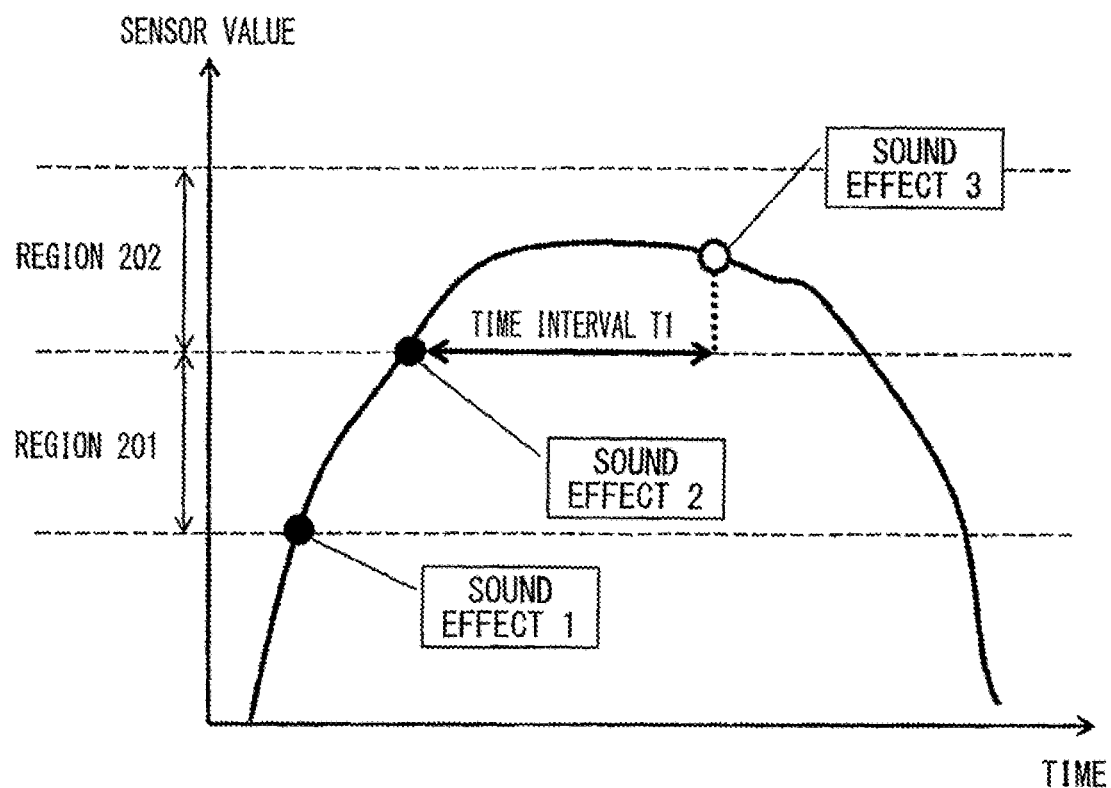
FIG. 2(b) An example of a gesture detection region.
Figure 2C:
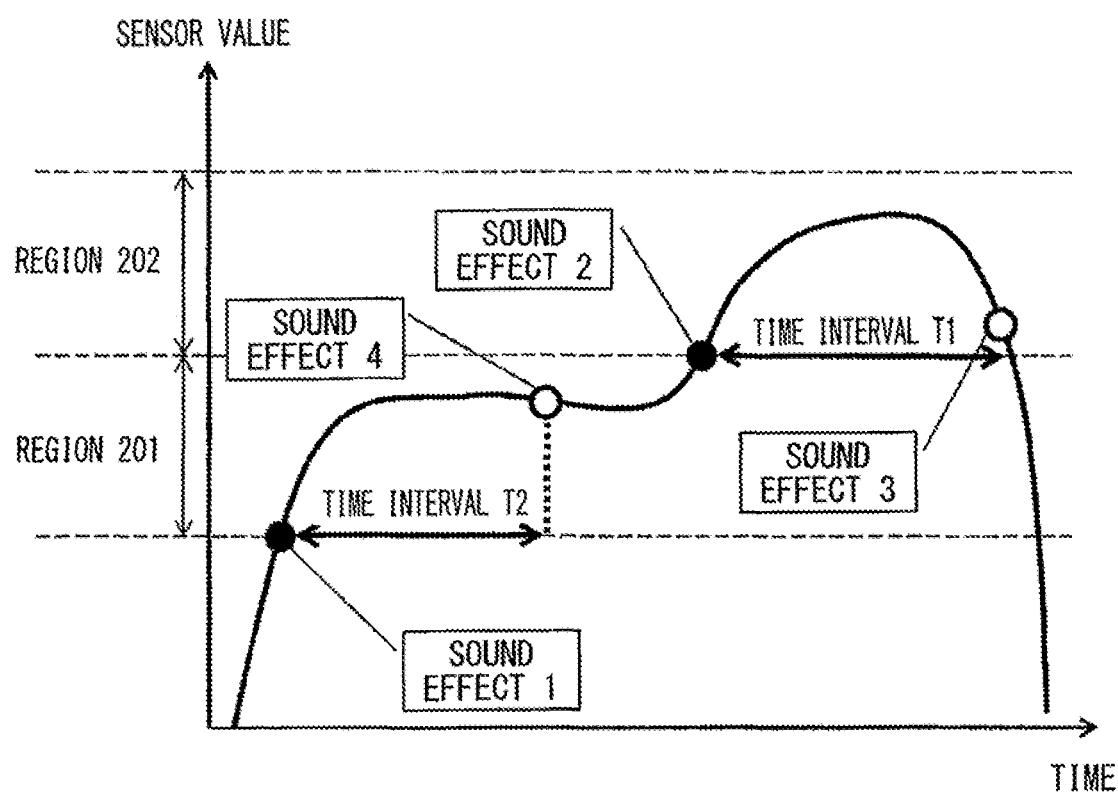
FIG. 2(c) An example of a gesture detection region.

FIG. 2(a) shows an example of installation of the sensing unit 103. This unit 103 is disposed on the driver's side in a right-hand-drive vehicle with respect to the display unit 108, and is capable of detecting information specifying the distance of a body from base point(s) of one or more sensor element(s) and movement of the body. Due to this, as shown in the lower section of this figure, the space between the in-vehicle device 101 and the user is divided into a plurality of regions, and the one of these regions in which the hand of the user is present is detected at high resolution. As shown in the figure, a distinction is made between a region 201 that is quite close to the position of the sensor(s) and a region 202 that is yet closer. It should be understood that the number of the sensor elements, the positions in which they are installed, and the detection regions are not to be considered as being particularly limited to those shown this figure.

The Main Operational Flow

The operation of the in-vehicle device 101 will now be explained using the operational flow shown in FIG. 3(a). It should be understood that although, when outputting an image and/or audio to the output units such as the display unit 108, the external display unit 109, the speaker 111 and so on, the messenger application 113 operates by transmitting image and/or audio information to the output information control unit 113, and by deciding whether or not information that has been received by the output information control unit 133 should be outputted to the output units described above, in order to simplify the following explanation, expressions will be employed such as "the messenger application 113 outputs an image to the display unit 108" and "the messenger application 113 outputs audio", and so on.

Figure 4A:
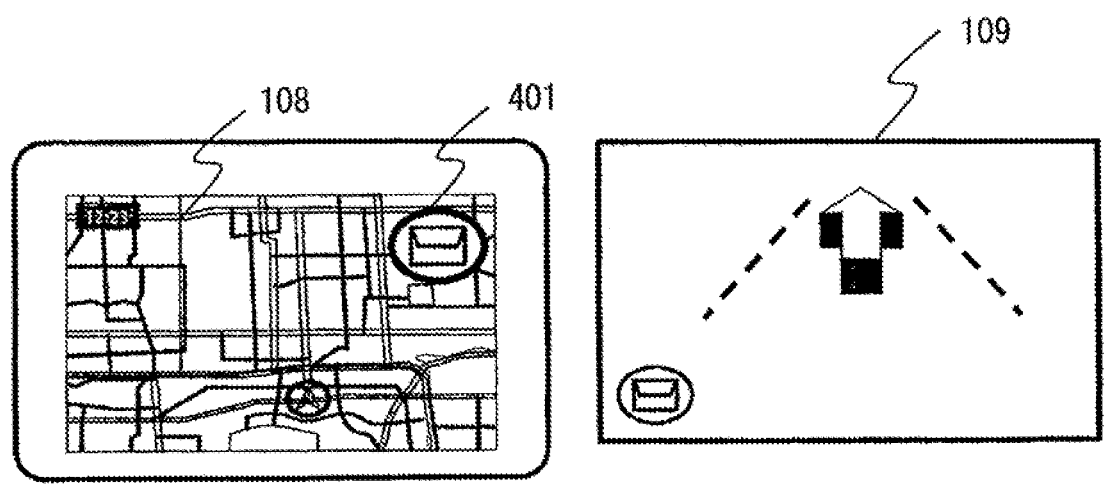
FIG. 4(a) An example of display upon a display unit and an external display unit.
Figure 4B:
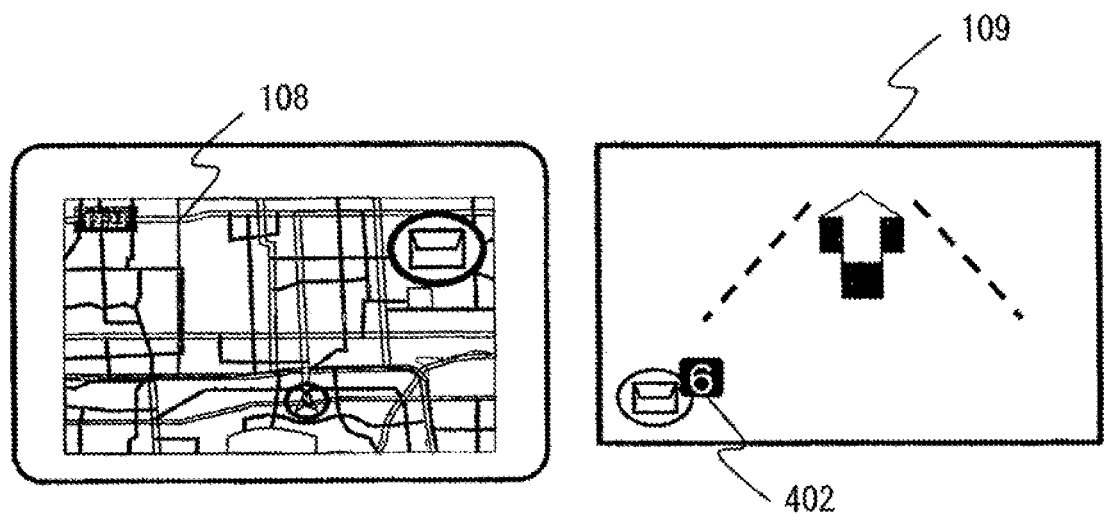
FIG. 4(b) Another example of display upon the display unit and the external display unit.
Figure 4C:
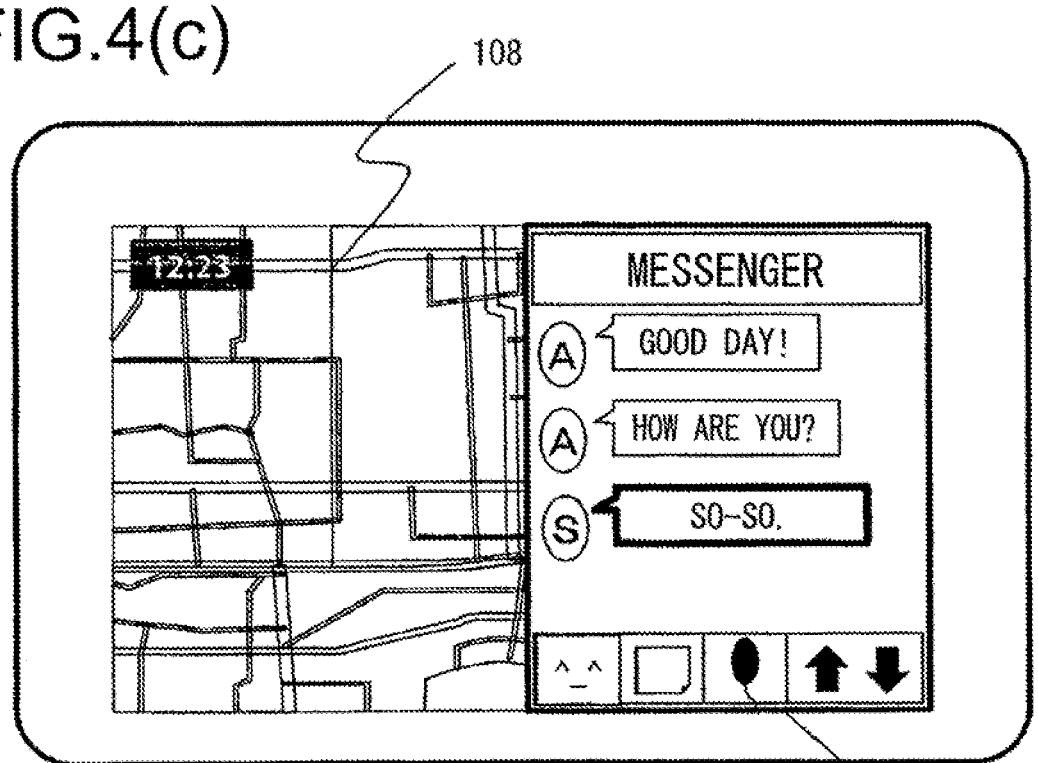
FIG. 4(c) An example of display upon the display unit and the external display unit.
Figure 4C:
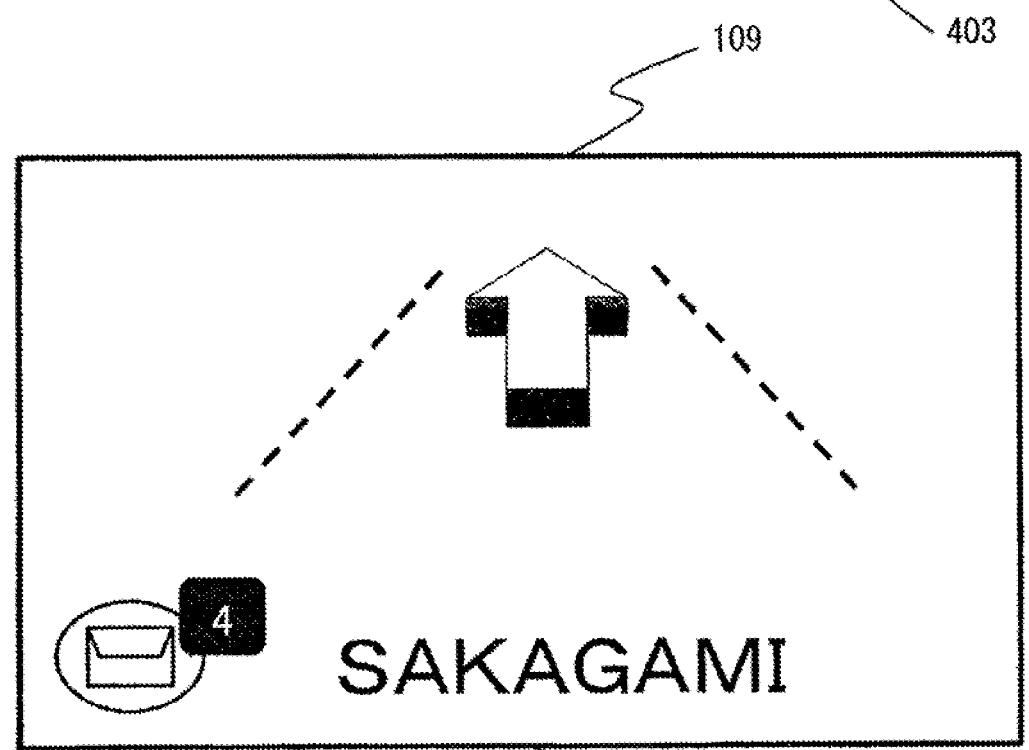
Figure 4D:
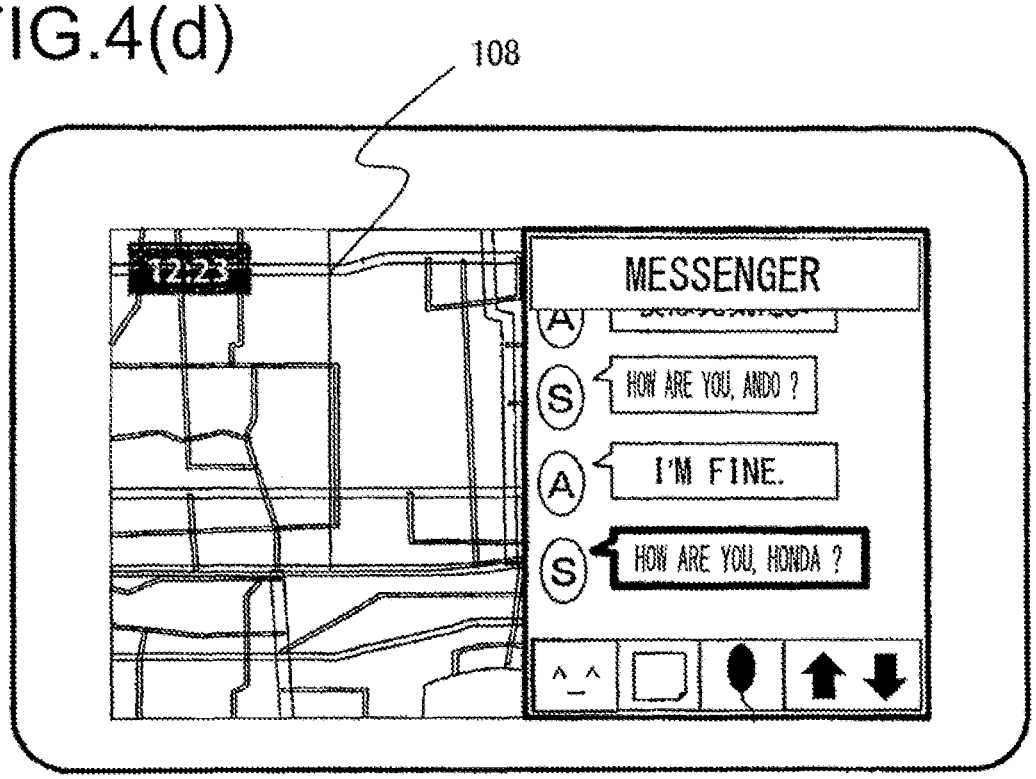
FIG. 4(d) An example of display upon the display unit and the external display unit.
Figure 4D:
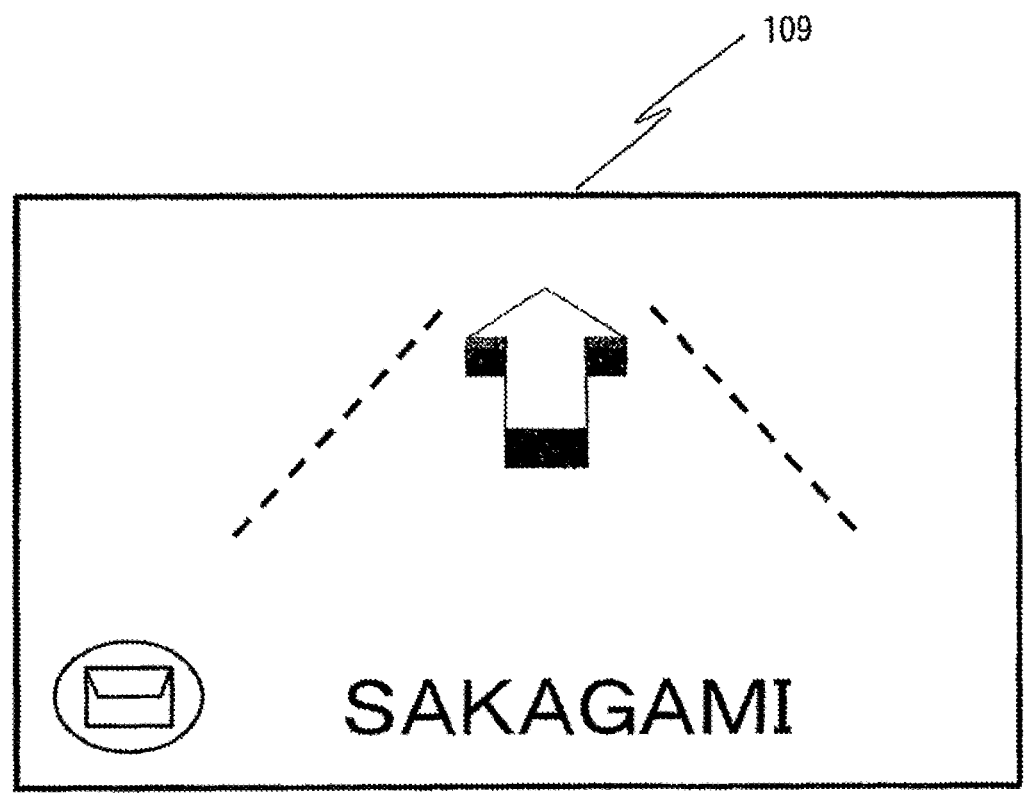
Figure 5A:
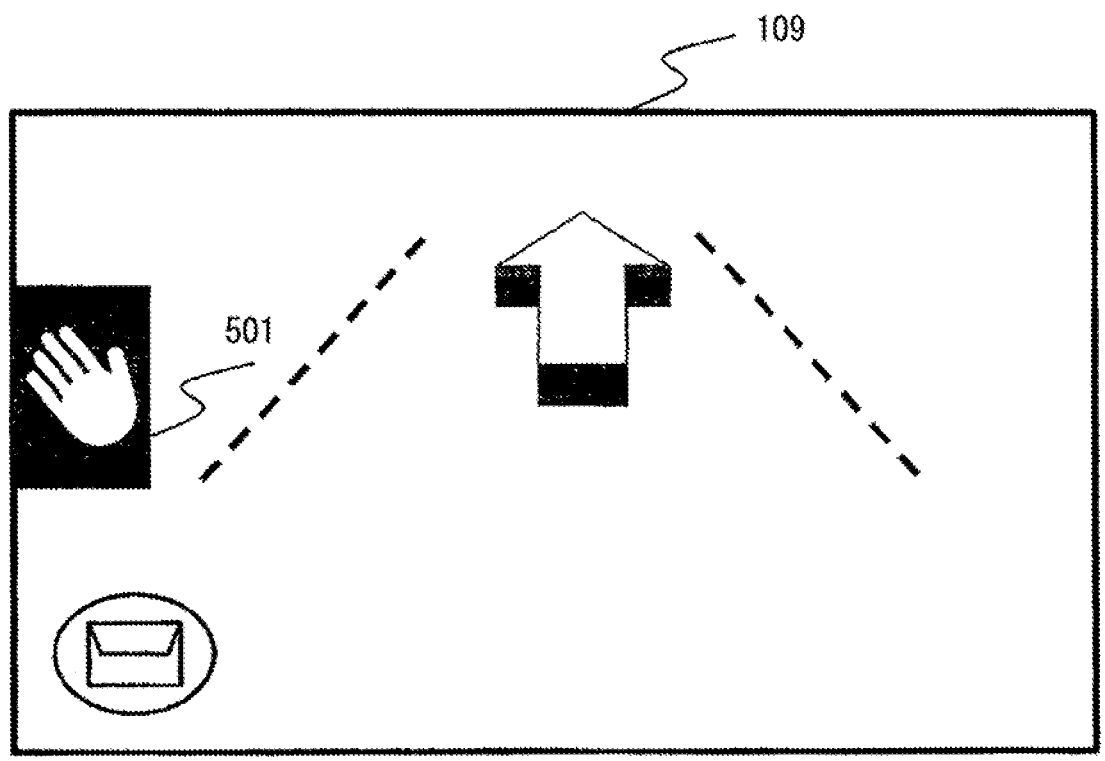
FIG. 5(a) An example of display upon the external display unit.
Figure 5B:
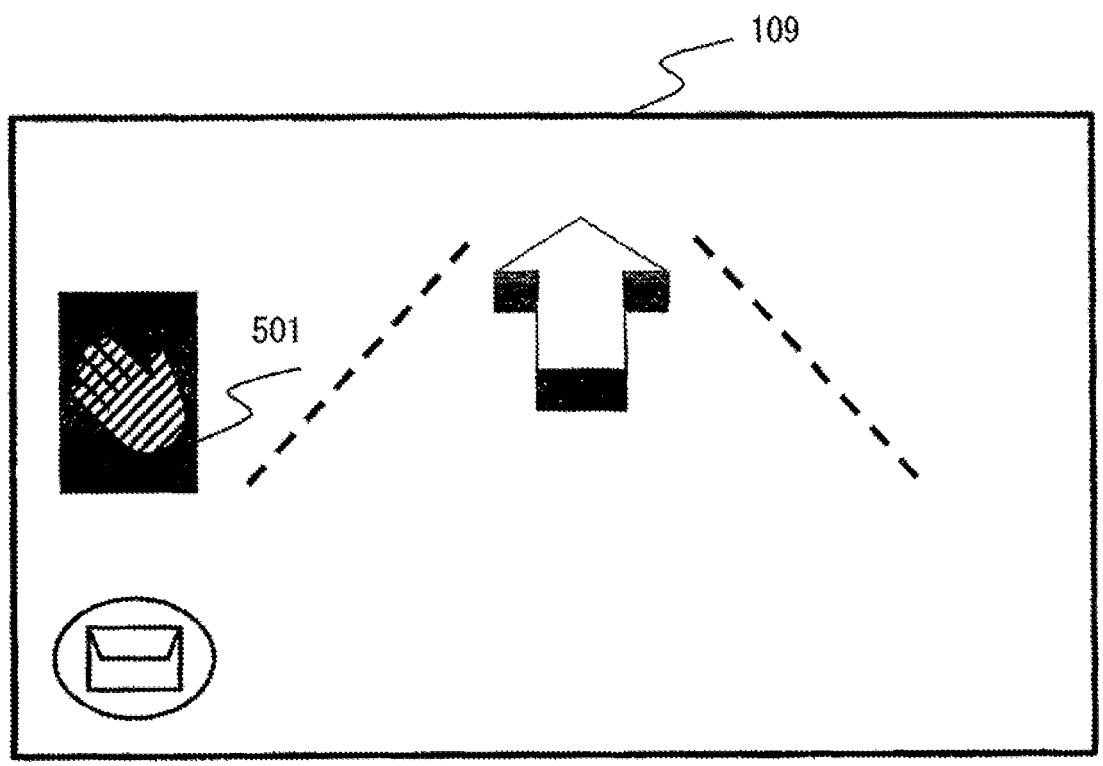
FIG. 5(b) An example of display upon the external display unit.
Figure 5C:
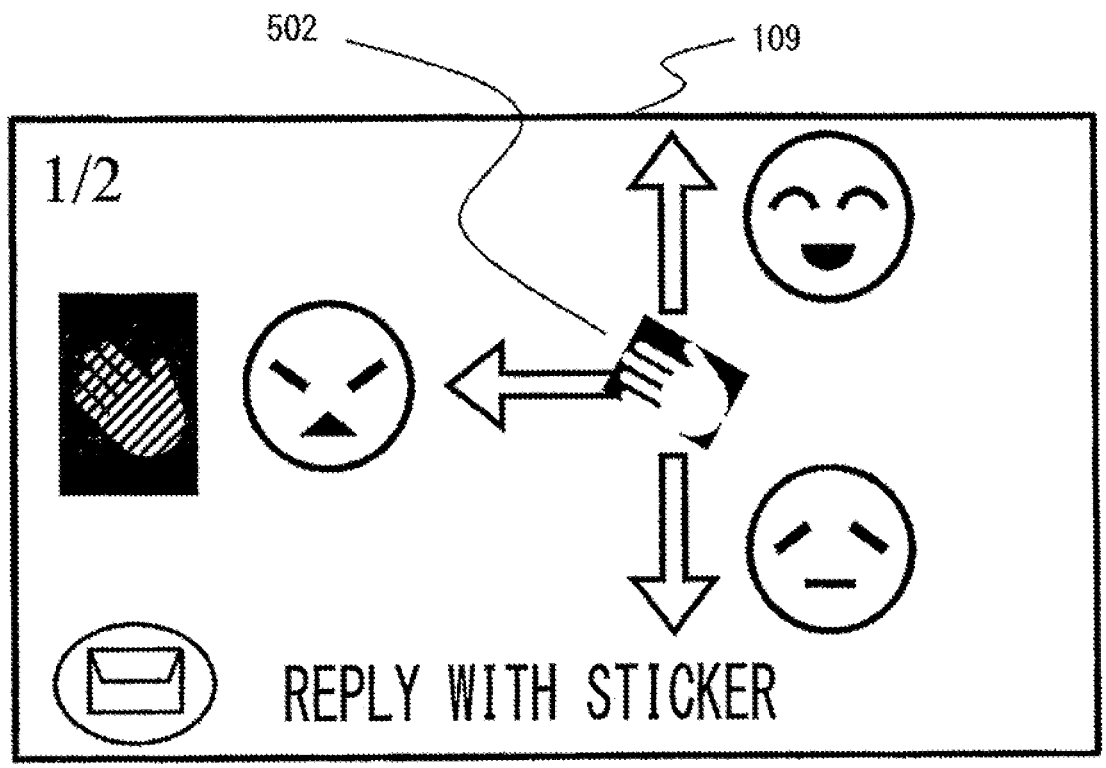
FIG. 5(c) An example of display upon the external display unit.
Figure 5D:
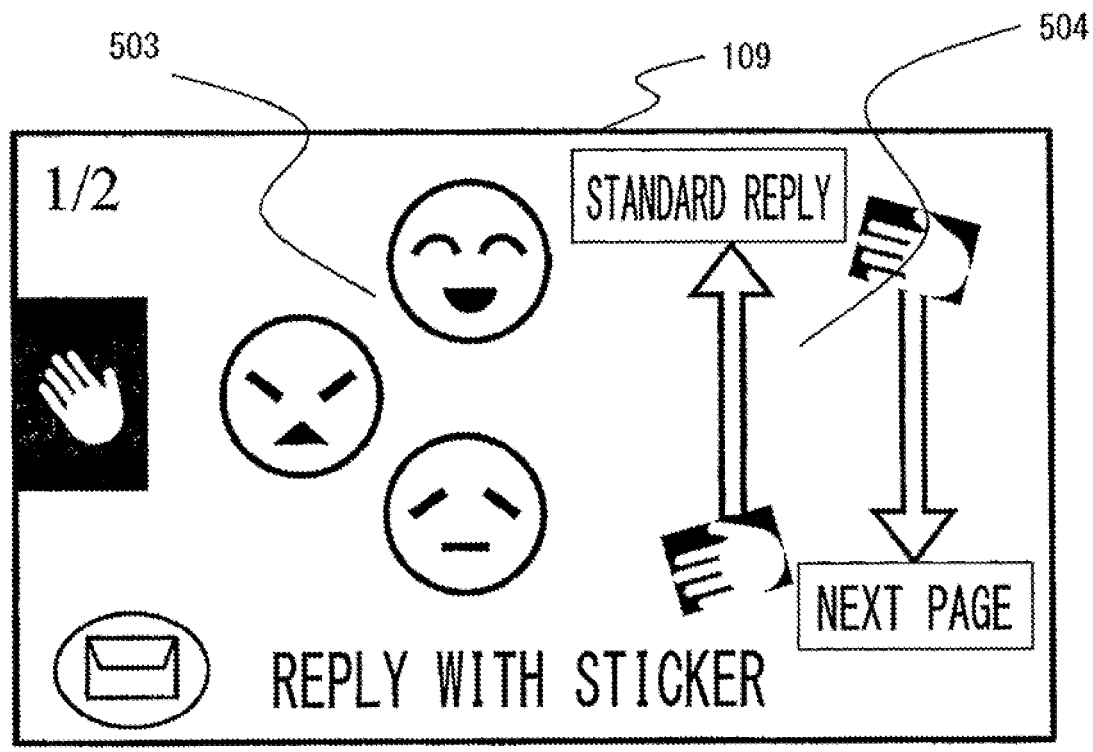
FIG. 5(d) An example of display upon the external display unit.

First the engine of the vehicle is started and so on, and the operation of the in-vehicle device 101 starts. When operation starts, a display related to navigation and an icon 401 for the messenger application 113 are displayed on the display unit 108 (here, this will be supposed to be a center display) by the output information control unit 114, as shown in FIG. 4(a). Upon starting of the in-vehicle device 101, the messenger application 113 is executed in the background by the in-vehicle device control unit 102, and is activated by the output information control unit 114 when the touch actuation unit 106 detects touch activation upon the icon 401, or when the gesture detection unit 104 detects a prescribed gesture operation by the user (for example, a hand gesture in the leftward direction in front of the sensor).

Furthermore, a display related to navigation and a display related to the messenger application 113 are displayed by the output information control unit 114 upon the external display unit 109 (here, this is supposed to be a HUD) when operation starts. And when a message has been received from the exterior via the communication unit 107 (S301), the messenger application 113 outputs a sound effect corresponding to message reception and causes the total number of messages that have been received to be displayed on the external display unit 109, as for example by the icon 402 shown in FIG. 4(*b*), so as to inform the user that the unread message count has increased.

Thereafter, when the fact that the user has performed actuation to start the messenger application 113 has been detected by the gesture detection unit 104, the voice recognition unit 116, the switch operation unit 105, the external switch operation unit 117, or the touch actuation unit 106 (S303), then, by activating the messenger application 113 the output information control unit 114 changes over to a display for use by the application, as shown in FIG. 4(*c*) (S304). Thereafter, the messenger application 113 outputs voice information by reading the received messages in order from the oldest to the newest (S305). FIG. 4(*c*) is an example of a display that is provided for the messenger application 113 upon half the screen of the display unit 108.

When the touch actuation unit 106 detects a touch upon the region of the icons 403 in FIG. 4(*c*), the messenger application 113 provides a display upon the display unit 108 for performing the following operations, listed from the left of the region covered by the icons 403: "reply with sticker", "standard reply", "compose reply", and "scroll message up/down". Furthermore, during the output of voice information in S305, the messenger application 113 displays upon the external display unit 109 the current number of unread messages and the name of the person who sent the message that is currently being read, as for example at 404 in the lower part of FIG. 4(*c*). And, if the gesture detection unit 104 detects a prescribed gesture action by the user (for example, a hand gesture in the upward or the downward direction) during the reading out of a message (S306: YES), then the messenger application 113 outputs voice information to the speaker 111 for reading out the newest message among the unread messages (S308).

If no gesture is detected, then the messenger application 113 outputs voice information so as to read out the unread messages continuously from the oldest to the newest (S307), and, when reading out control for the newest message has been completed, the system goes into the state of waiting for reply operation (S309), with a display of the last person who send a message being continued on the display unit 108 and the external display unit 109, as shown in FIG. 4(*d*). In the state in which reply operation is being awaited, the messenger application 113 displays an icon 501 upon the external display unit 109 meaning that reply operation can be performed with a gesture, as shown in FIG. 5(*a*).

If a fixed or certain time period (for example, 0.5 seconds) has elapsed in the state in which the driver's hand is raised into the region 202 of FIG. 2(*a*) (S310: YES), then it is determined that the starting condition for operation is satisfied, and the display upon the external display unit 109 is changed over so that a menu that is an operation guide for reply operation slides over from the right side of the screen, and, along therewith, a sound effect is outputted in order to signal that this menu has emerged (S311). It should be understood that, if the hand of the user has been detected within the region 202, it would also be acceptable to arrange for the messenger application 113, along with outputting a sound effect to inform the user of this fact and thereby notifying the user so that be can recognize it by ear, also to issue a visual notification by shifting the icon 501 to the right side as shown in FIG. 5(*b*) or by changing the color of this icon, so that the fact can be recognized visually. Further-more, if the hand of the user is detected, not within the region 202, but within the region 201, and a fixed time period (for example, 0.3 seconds) has elapsed, then the messenger application 113 outputs a sound effect to notify the user that the position in which he is raising his hand is different. Due to this, when the user raises his hand, it is possible for him to perform the operation of hand raising while looking forward, even without bringing his hand into his line of sight.

The relationship between the state of detection of the hand of the user and sound effect output is shown in more detail in FIGS. 2(*b*) and 2(*c*). FIGS. 2(*b*) and 2(*c*) are figures showing time along the horizontal axis and the sensor value from the sensing unit 103 along the vertical axis, and show the boundary at which the sensor value can be used for discriminating between the region 201 and the region 202.

FIG. 2(*b*) shows an example when the user raises his hand toward the region 202, and has raised his hand for a fixed time period. When the gesture detection unit 104 detects the fact that the user's hand has entered into the region 201, a sound effect #1 is outputted. Next, a sound effect #2 is outputted when the fact that the region 202 has been entered is detected. If the fact that the hand of the user is in the region 202 has been continuously detected for a time interval T1 or longer (for example, for 0.5 seconds or more), then a sound effect #3 is outputted, and the display of the external display unit 109 is changed over as explained in S311.

The example of FIG. 2(*c*) is an example of a case in which the raising of the user's hand into the region 201 is continued. The sound effect #1 is outputted when the fact that his hand has entered into the region 201 is detected, and, if his hand continues to be detected in the region 201 for a time interval T2 or longer (for example, for 0.3 seconds or more), then a sound effect #4 is outputted. If subsequently the user's hand is detected in the region 202, then the same thing happens as in the example of FIG. 2(*b*) (in the following description, in some cases, operation in which the user raises his hand into the region 202 for the time interval T1 or longer is simply termed "hand raising").

FIG. 5(*c*) is an example for a case in which an operation menu is displayed upon which it is possible to send a reply with a sticker. An icon 502 is an operation guide that means that if, with the user's hand in the raised state, be performs a gesture in the upward, leftward, or downward direction, then a sticker corresponding to that gesture can be selected. Furthermore, the display of "½" in the upper left gives the total number of pages of sticker candidates and the current page. If, in this state, a gesture in the upward, leftward, or downward direction is detected (S312: YES), then the messenger application 113 selects the sticker corresponding to that direction and performs reply operation (S313), and then transitions to the standby state S309 for reply operation for a second time.

If the hand of the user is removed from the region 202 without any gesture having been detected (S312: NO, S314: YES), then the contents of the display upon the external display unit 109 are changed over (S315), as shown in FIG. 5(*d*). The icons 503 denote candidates for stickers that can be currently selected. And the icons 504 mean that, when a gesture action corresponding to the direction that is shown (i.e. an upward hand gesture or a downward hand gesture) is performed, the corresponding operation will be performed. Moreover, the display of "STANDARD REPLY" means that the reply method is changed over to replying with a standard message, while the display of "NEXT PAGE" means that the candidate stickers for selection that are displayed by the icons 503 can be changed over to the next candidate group.

Since, if a large number of options are displayed at one time, selecting one of them will take more time than is desirable in view of the fact that the user is driving, so that there is a possibility that he will lose his concentration upon driving, accordingly, in this embodiment, while providing only the three options for the sticker that the driver intends to transmit at the upper, left, and lower screen positions, it is still possible to supply more options than three to the user by providing a gesture for increasing the number of options. If a corresponding gesture action is detected (S316: YES), then the operation corresponding thereto is executed (S317). But if no gesture is detected (S316: NO), and if the hand of the user is detected in the region 202 (S318: YES), then the messenger application 113 transitions to the state of S311, and enters the state for performing sticker selection for a second time.

Figure 6:
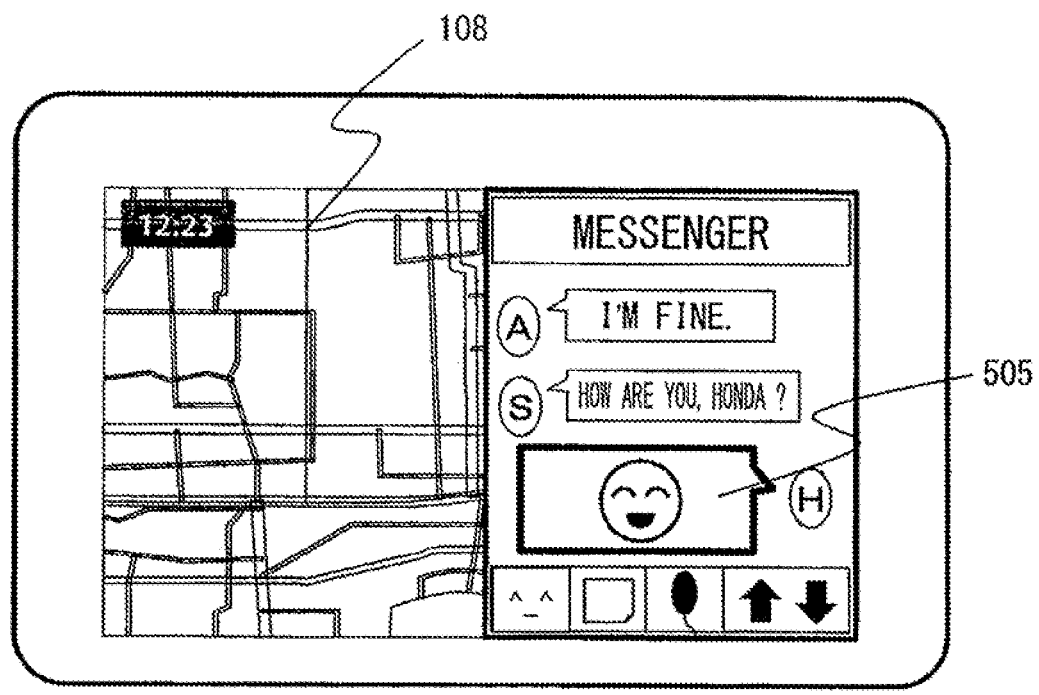
FIG. 6 Another example of display upon the display unit and the external display unit.
Figure 6:
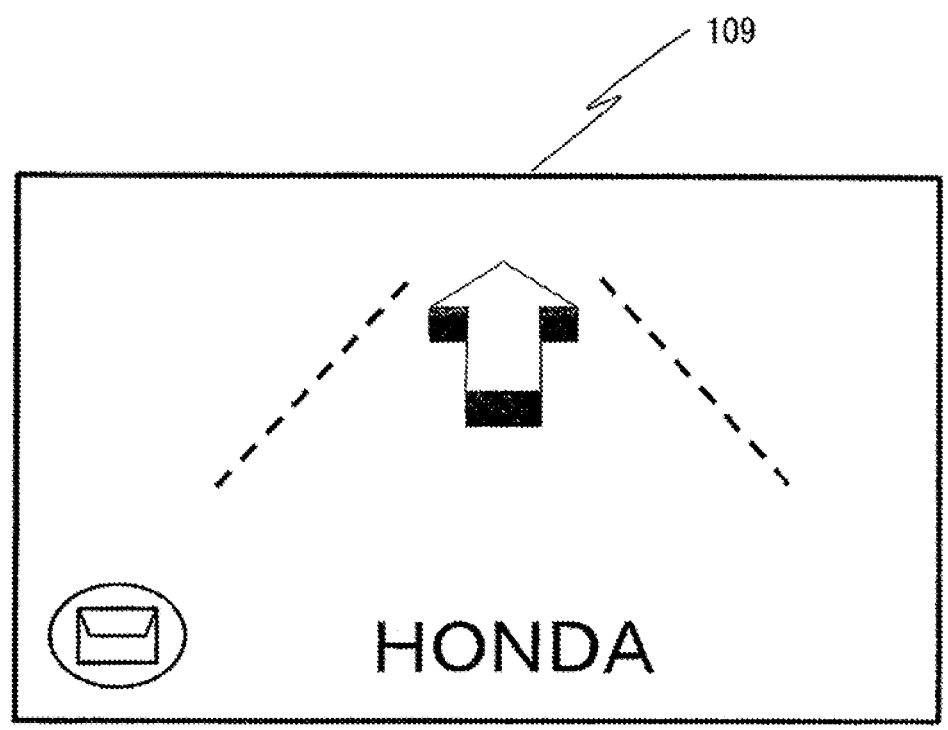

If a fixed time period (for example 10 seconds) has elapsed in the state without the hand of the user being detected, (S318: NO, S319: YES), then the messenger application 113 deletes the operation guide from the display upon the external display unit 109, and transitions to the reply operation standby state of S309 (S320). When a reply operation has been performed, as shown in FIG. 6, the messenger application 113 displays the details of the reply operation result (here, the selected sticker) upon the display unit 108, and the name of the user who performed the reply operation is displayed upon the external display unit 109 and the contents of the reply are read out.

Figure 3B:
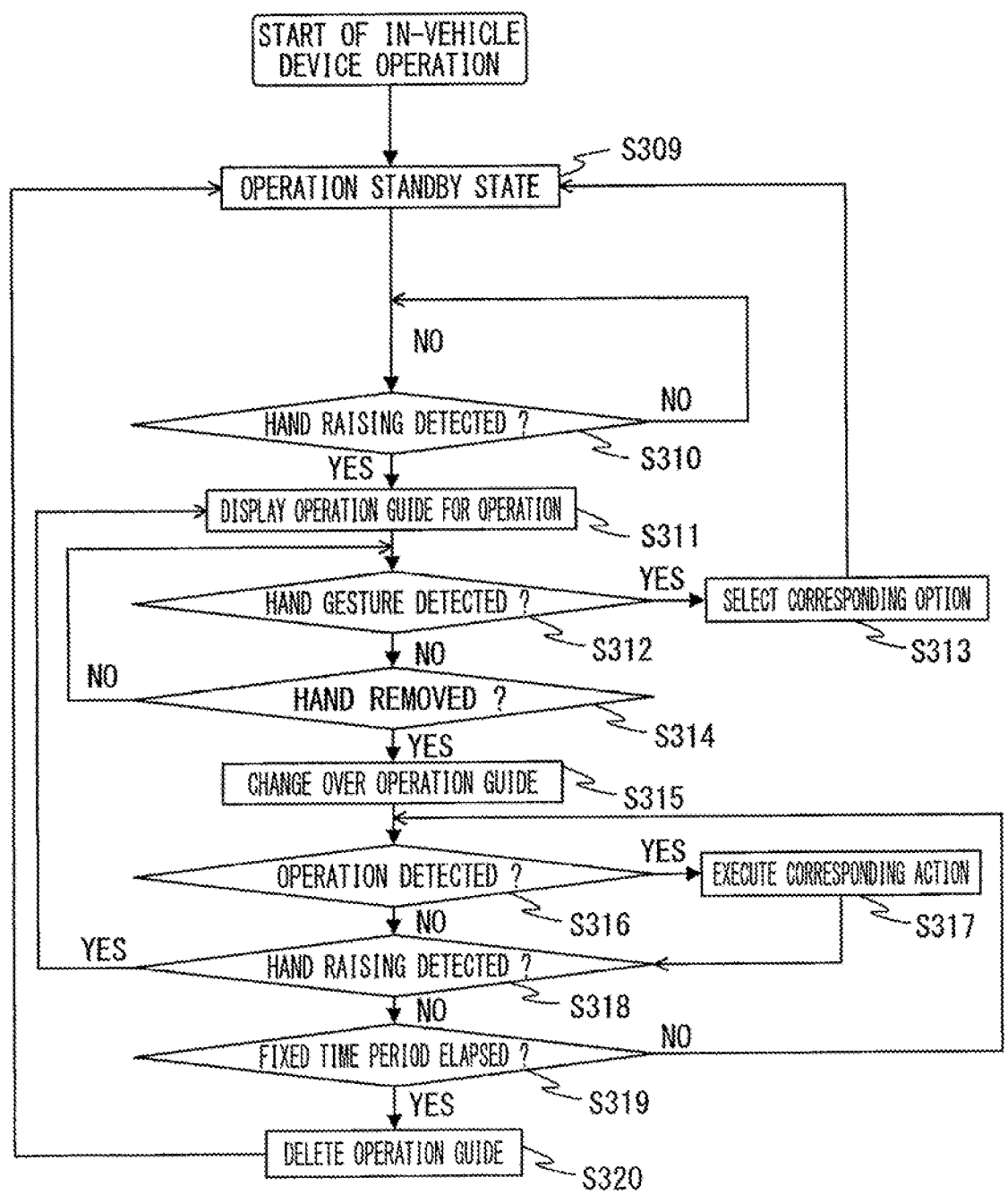
FIG. 3(b) An example of operational flow in the first embodiment.

It should be understood that the present operation flow is only a representative example of the operation of the in-vehicle device of the present invention, and that the operation and the display and sound effects and so on described for this example should not be considered as being limitative. For example, while in the present explanation the description supposes that reply operation is performed during use of the messenger application 113, this should not be considered as being limitative of the present invention; the present invention could also be applied in general to operation by the in-vehicle device control unit 102 for selection from a plurality of options. A simplified version of the operation flow is shown in FIG. 3(b). While the fundamental operation is as explained above, and in the following explanation of the operation steps to which the same step numbers as in FIG. 3(a) are appended are the same, in relation to S316 of this FIG. 3(b), this step is not limited to receipt of up and down hand gestures; it would also be acceptable to arrange to receive various actions, such as, for example, actuation with a steering switch or the like.

Moreover, if a message is received from externally, then it will be acceptable to arrange to read this message out as soon as it is received, and it will also be acceptable to display the contents of this received message upon the external display unit 109 as well. By doing this, it becomes easier for the user to understand this message. Furthermore, it may be arranged to standby for reception of reply operation at any time, and not to wait until reading out of the newest message has been completed. In this way, the user is able to perform reply operation at any time. Moreover, it may be arranged to present a tactile sensation with the tactile IF unit 112 in the air in the region 202 in which the hand of the user is to be raised.

For example, it may be arranged for a pressure point of an ultrasound element array to appear at the boundary of this region, or to impart a tactile sensation in a line orthogonal to this region with a blower. By doing this, the user is able to perform hand raising while looking forward, so that he is able to perform reply operation safely even though he is performing this operation while driving. Moreover while, in this example, the system transitions to the state of replying with a sticker after raising of the hand of the user has been detected, it would also be acceptable to arrange, before this, for the system to transition to a state for selection of the reply method (reply with sticker, standard reply, compose reply, or the like). With this arrangement, the user is able to select the reply method that he wishes at the start of reply operation.

Furthermore while, in this example, it is arranged to receive a gesture after having detected hand raising and after having displayed the operation guide upon the external display unit 109, it would also be acceptable to arrange to receive a gesture after a predetermined time period before the operation guide is displayed (for example 0.2 seconds before). By doing this, if a user who is accustomed to the operation of the system remembers which operation corresponds to which gesture, then he will be able to perform operation without more information than necessary being displayed upon the external display unit 109, and thereby the time for operation can be shortened.

Furthermore, while a fixed time period was measured in S319, it would also be acceptable to arrange to proceed to S320 before this condition is satisfied if some predetermined action is detected (for example, execution of a hand gesture toward the left, or operation of a switch or the like). Due to this, it is possible for the user to change over the display upon the external display unit 109 to navigation at a desired timing.

Figure 7A:
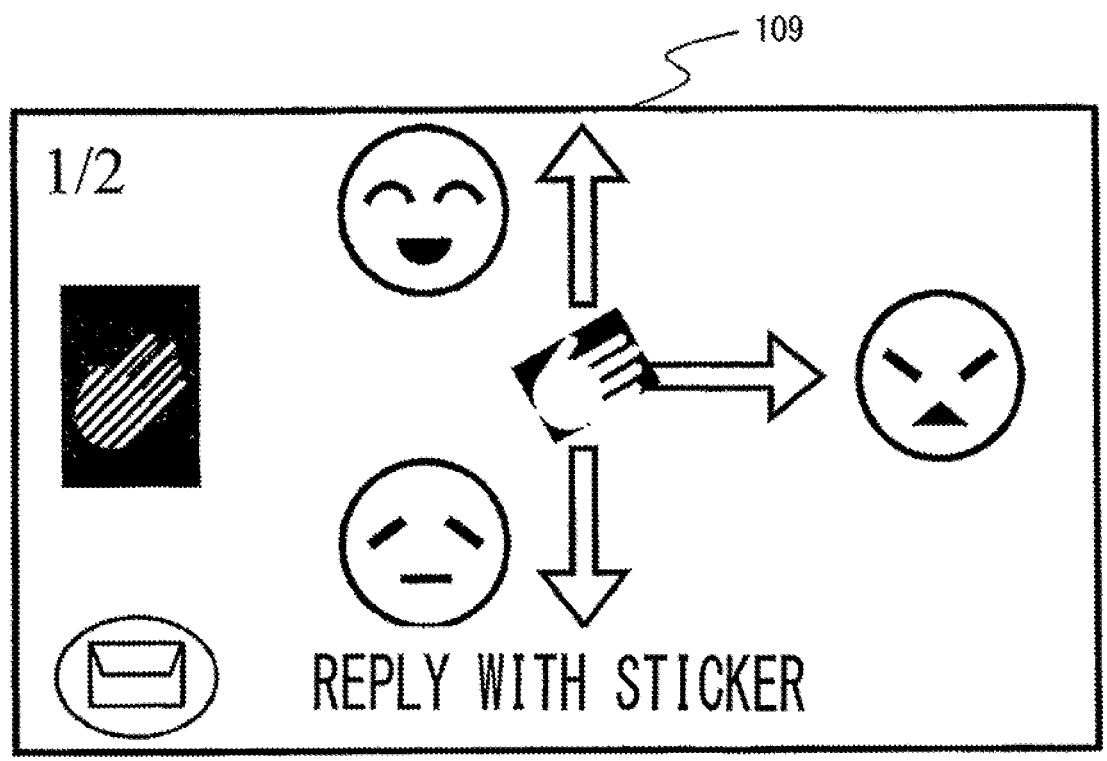
FIG. 7(a) Another example of display upon the external display unit.
Figure 7B:
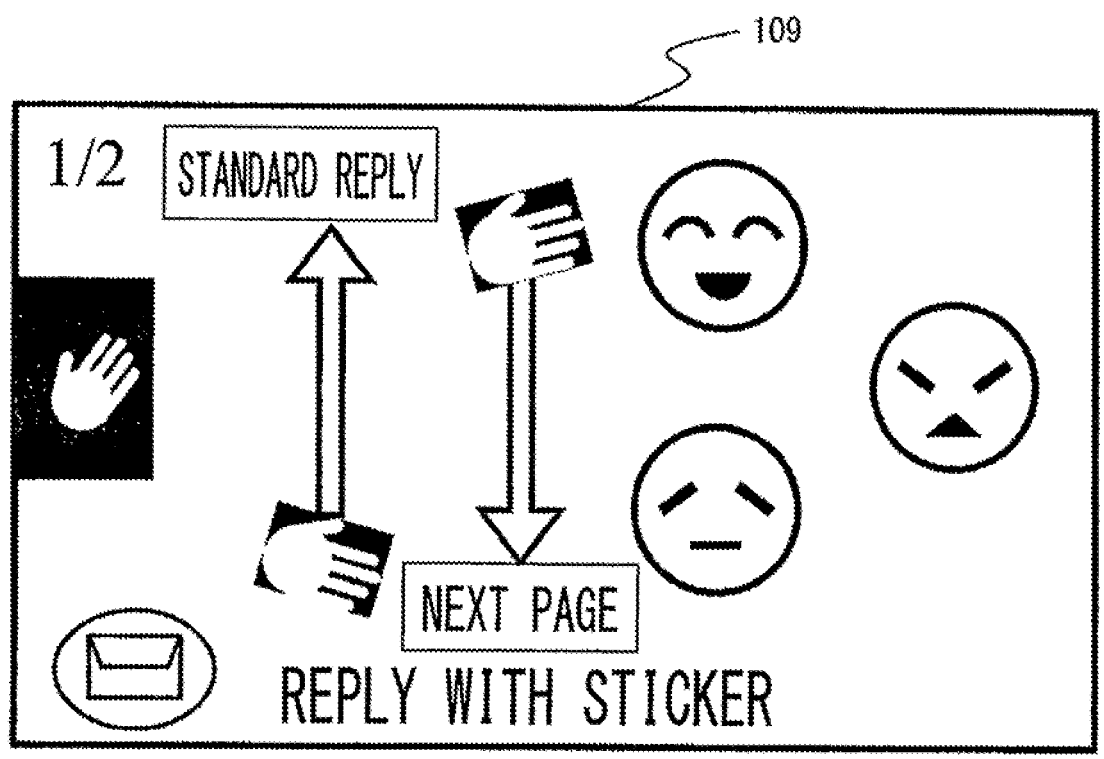
FIG. 7(b) An example of display upon the external display unit.

Moreover, in relation to the operation guide that is displayed upon the external display unit 109 and the directions of the gestures therein, these are not limited to being in three directions; it would be possible to employ any desired directions and any number of such directions. At this time, it would be appropriate to set directions in which it is easy for the driver to perform gestures while he is sitting in the driving seat. For example there is some danger that, if the driver performs a gesture in the direction towards the steering wheel, his hand may interfere with the steering wheel during this action, and accordingly it may be arranged for such a gesture not to be included as a subject. It may be arranged for whether the steering wheel of the vehicle that the driver is driving is on the right side or on the left side to be set in advance on a setting screen, and, if the vehicle is a left hand drive vehicle, then, as shown in FIG. 7, the operation guide that is displayed upon the external display unit 109 may take, as subjects, the three directions of upward, downward, and rightward. It should be understood that FIGS. 7(a) and 7(b) are figures corresponding to FIGS. 5(a) and 5(b) respectively.

Furthermore, the displays and the orientation of the icons also may change depending upon the side of the vehicle where the steering wheel is installed, since the hand that is typically employed for gestures also changes. Yet further, it would also be acceptable to arrange for it to be possible for each user to set the icons individually, since the way in which icons of various types are seen may change depending upon the position of the steering wheel. Due to this, it becomes possible to perform gesture actions that correspond to the installation position of the steering wheel in each of various types of vehicles and that thus are easy to employ, and the user is enabled to perform various types of operation by gestures while sitting in the driving seat without doing anything unreasonable.

Figure 8A:
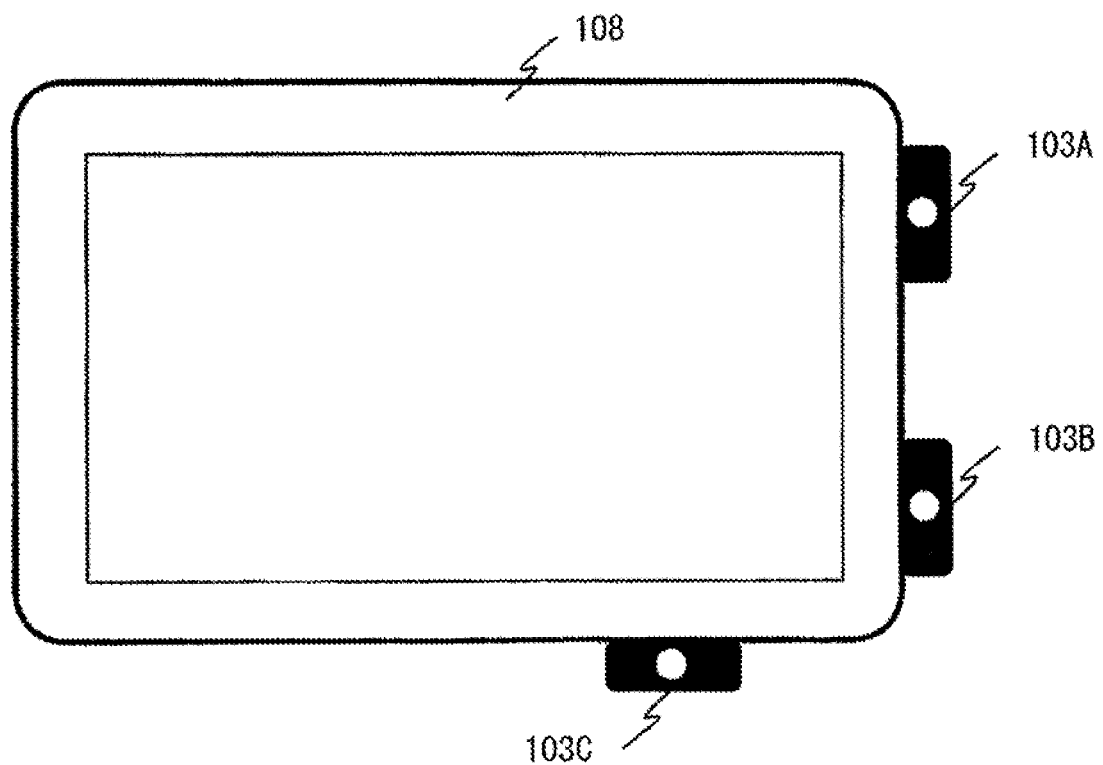
FIG. 8(a) An example of installation of a sensing unit.

Even further, it would also be possible to arrange for the position at which the driver raises his hand not to be limited to a single location as in this example, but for raising of his hand to be performed at a plurality of locations. For example, as shown in FIG. 8(a), three sensors may be installed at three locations. It would also be possible to arrange for the reply method to be determined according to which of these sensors is the one in front of which the driver has raised his hand. As shown in FIG. 8(b), it may be supposed that "REPLY WITH STICKER" corresponds to the sensor 103A, "STANDARD REPLY" corresponds to the sensor 103B, and "COMPOSE REPLY" corresponds to the sensor 103C. With this arrangement, the user is able to select a reply method and to perform reply operation quickly. It would also be acceptable to arrange for the user to be able to designate in advance which of the sensors corresponds to which reply method.

Figure 9:
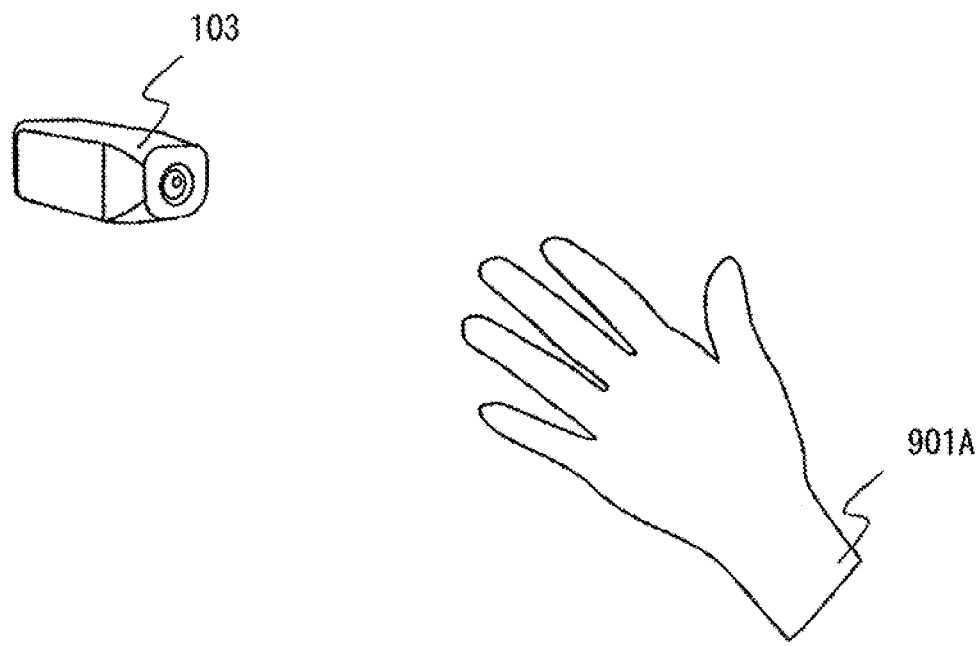
FIG. 9 An example of a sensing unit and configurations of the hand of the user.
Figure 9:
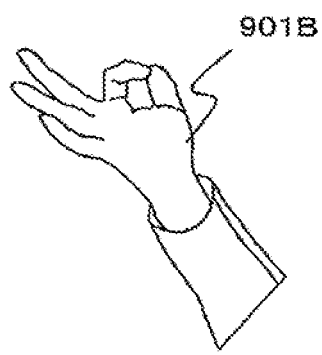
Figure 9:
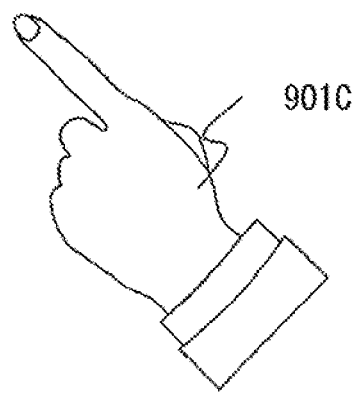

Still further, as shown in FIG. 9, it would also be possible to provide a structure that employs a camera for the sensing unit 103, so as to be capable of detecting the approach of the driver's hand and his gestures. A predetermined image of the shape of a hand is learnt in advance, and raising of his hand by the user is detected from pattern recognition of an image that is inputted and data that has been learnt, irrespective of the distance and the position of that hand. At this time it would also be acceptable to make it possible to detect a plurality of hand shapes when the user raises his hand (901A through 901C), so as to make it possible to select the reply method. By doing this it is still possible to perform starting of reply operation, even if the user does not make any gesture in front of the sensing unit 103 by extending his hand.

Figure 10A:
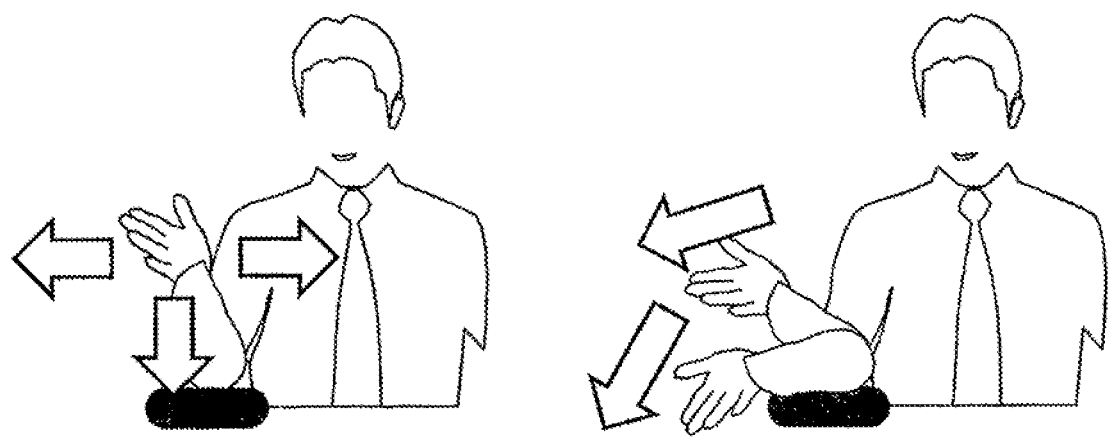
FIG. 10(a) An example of ways in which the user can raise his hand.
Figure 10B:
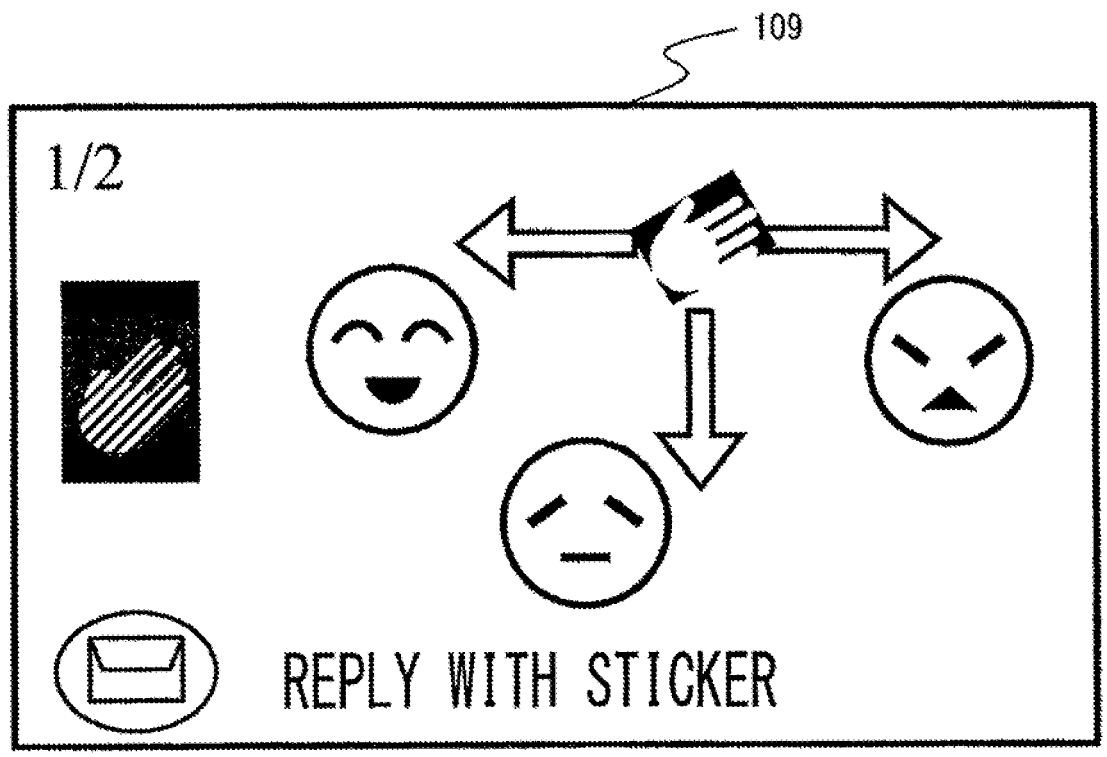
FIG. 10(b) An example of display upon the external display unit.

Yet further it would also be acceptable, when hand raising has been detected, to arrange for the directions and the number of the gestures that are received to be changed according to the position and the attitude of the hand of the user. For example if, as shown in FIG. 10(a), the user raises his hand and this hand raising is detected as having been performed in the state in which the user has placed his elbow upon an armrest, then, as shown in FIG. 10(b), the leftward, downward, and rightward direction may be taken as subjects for recognition. These three directions are taken as subjects for recognition because, with the posture of the user in this situation, it is considered to be difficult for him to make a gesture in the upward direction. Furthermore, it would also be acceptable to arrange for the user to be able to make a setting in advance as to which gestures will be taken as subjects for recognition. With this arrangement, the user will become able to perform gestures in freely chosen attitudes.

Figure 11A:
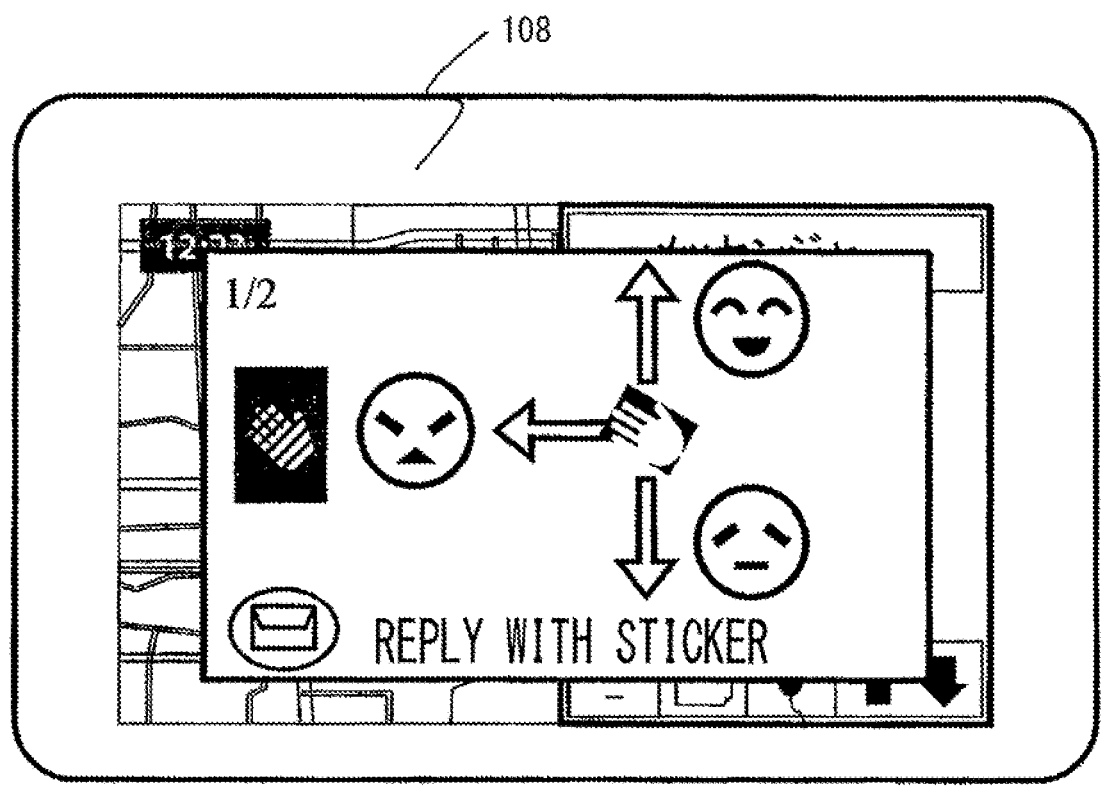
FIG. 11(a) An example of display upon the display unit.

Moreover while, in this example, the operating menu for reply operation and so on is displayed upon the external display unit 109, it would also be acceptable to arrange for the location where the display is provided and the details of the display to be changed according to the states of connection of devices of various types, their positions of installation, and so on. For example, if no HUD is connected, then, as shown in FIG. 11(a), the guide to gesture actions may be displayed upon the center display. At this time, as shown in FIG. 11(b), processing is performed to manage the installation positions and the connection states of the plurality of devices, and to determine their priority levels. While fundamentally the operation guide is displayed upon the display whose priority level is the highest, if the HUD has suffered a failure or the like, then it cannot be employed, so that the guide is displayed upon the display whose priority level is the next highest. At this time, it would also be acceptable to shorten the time period for displaying the guide according to the priority level, or to reduce the amount of information that is displayed, or the like. The priority levels may be set at the time of shipping from the factory or at the time of sale, or may be set by the user upon a setting screen not shown in the figures; or they may be programmed upon a terminal mounted in this vehicle so as to determine the priority levels from the nature of the displays that are connected to the in-vehicle device, or the like; or they may be set by a method of some other type.

Furthermore, if a portable external device (such as a smart phone or the like) is connected to the in-vehicle device 101 as shown in FIG. 11(c), then it is also possible to arrange to increase its priority level according to its position of installation. According to this concept, supposing that it is not possible to utilize the proper device such as a HUD or the like for displaying the operation guide, then it becomes possible to display the operation guide upon this alternative display, and to perform operation thereupon.

Figure 12A:
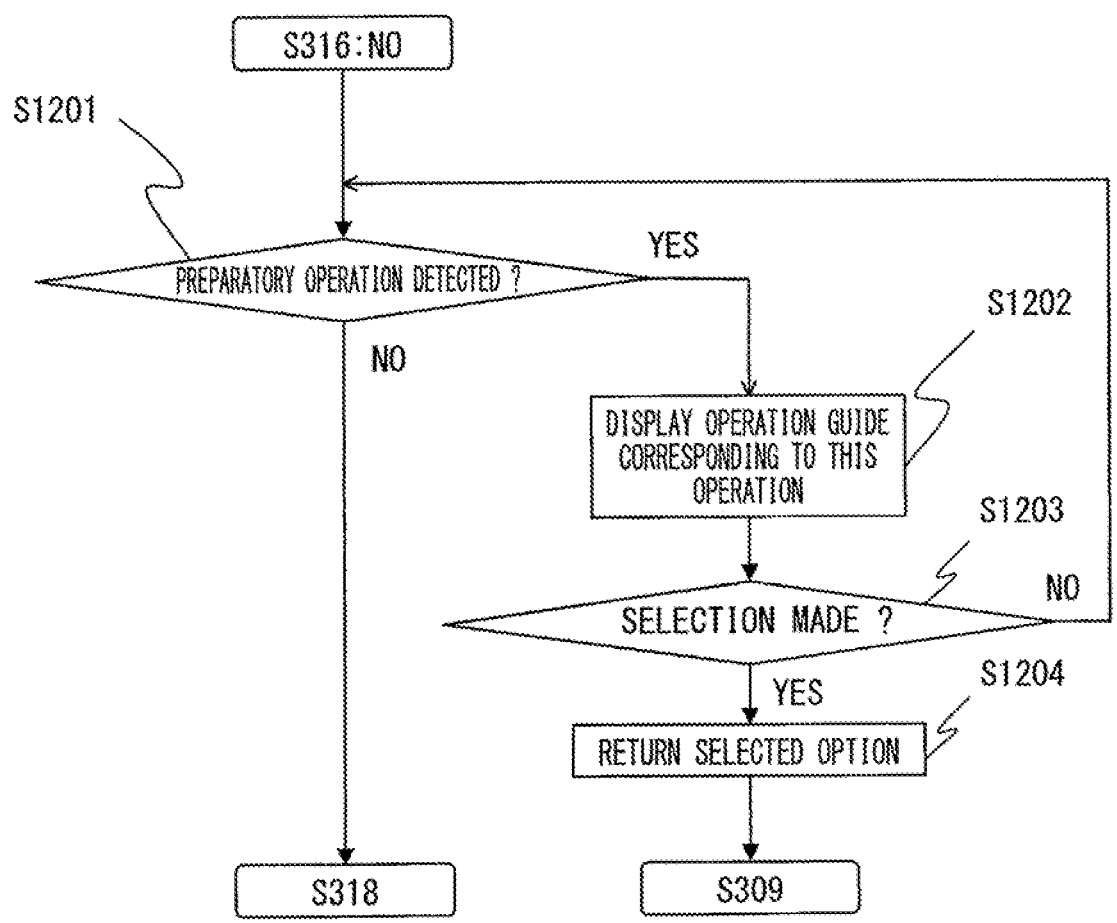
FIG. 12(a) An example of operating flow
Figure 12B:
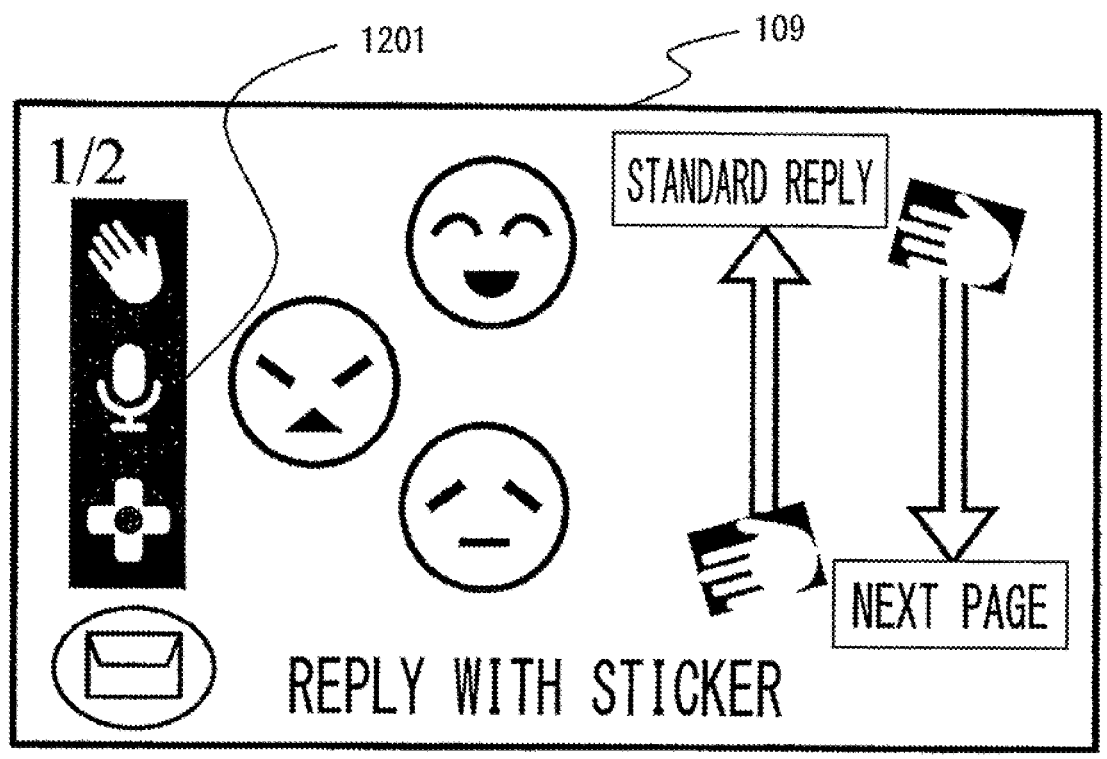
FIG. 12(b) An example of display upon the external display unit.

Yet further, the reply operation of S131 and subsequently in FIG. 3(a) or FIG. 3(b) is not only limited to utilizing gesture actions; it would also be acceptable to arrange to make it possible to utilize some other operating means that is capable of operating the in-vehicle device (such as voice recognition operation or switch operation or the like). FIG. 12(a) shows the operation flow at this time. After the step S316, if a preparatory operation before the user tries to operate some operating means is detected (S1201: YES), then an operation guide that corresponds to this operation is displayed upon the external display unit 109 (S1202). Thereafter, when selection operation is executed (S1203: YES), a reply is made according to the operation that has been selected (S1204). In concrete terms, when transition has been made to the state of S315, an operation guide such as shown in FIG. 12(b) is displayed upon the external display unit 109. The upper one of icon 1201 means that selection of options can be performed by gestures, the center one of icon 1201 means that selection of options can be performed with voice recognition, and the lower one of icon 1201 means that selection of options can be performed with a switch.

Figure 12C:
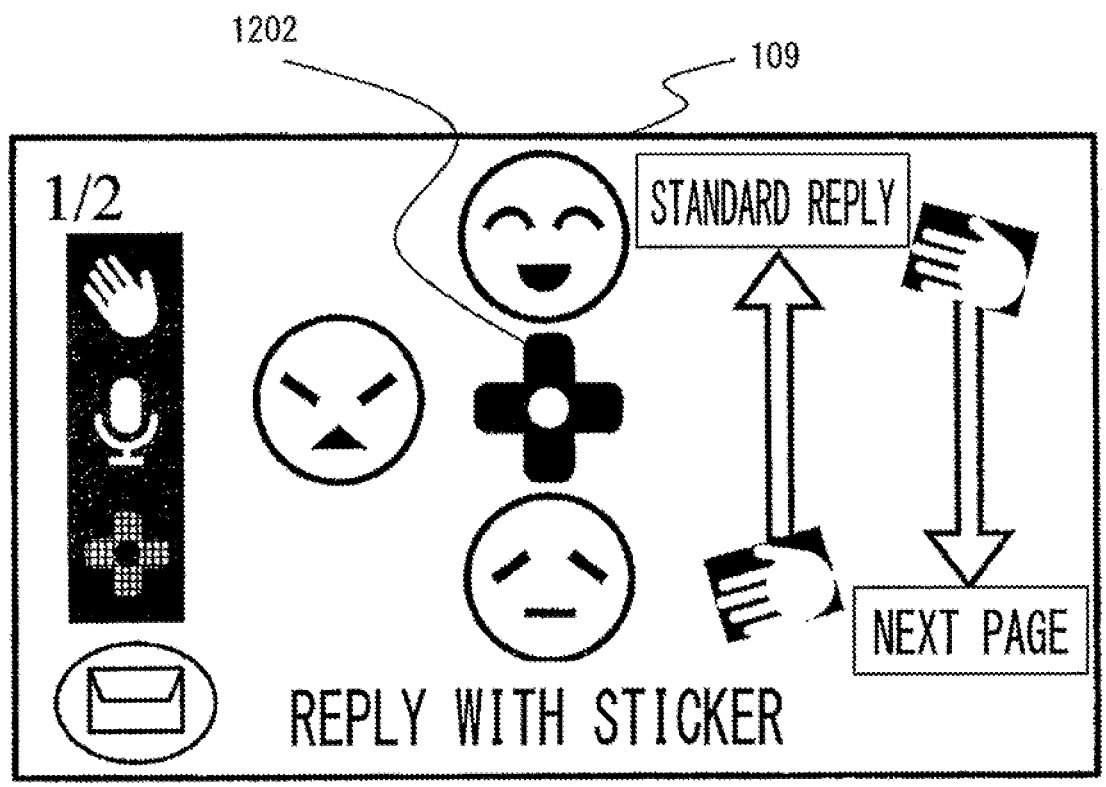
FIG. 12(c) An example of display upon the external display unit.

If it is detected that the user has performed some action via the steering controller (for example, if some button upon a steering switch is pressed once, or if a reaction is obtained from a contact sensor that is installed upon the switch surface), then the system transitions to a screen such as that shown in FIG. 12(c). The user is informed of the fact that steering controller operation is active by change of the colors of the icons 1201. According to which button of the steering controller is pressed, reply operation is performed with the corresponding sticker. It should be understood that if a fixed time period elapses, or if the contact sensor of the steering controller has ceased to react, then the system returns to the screen of FIG. 12(b).

Figure 12D:
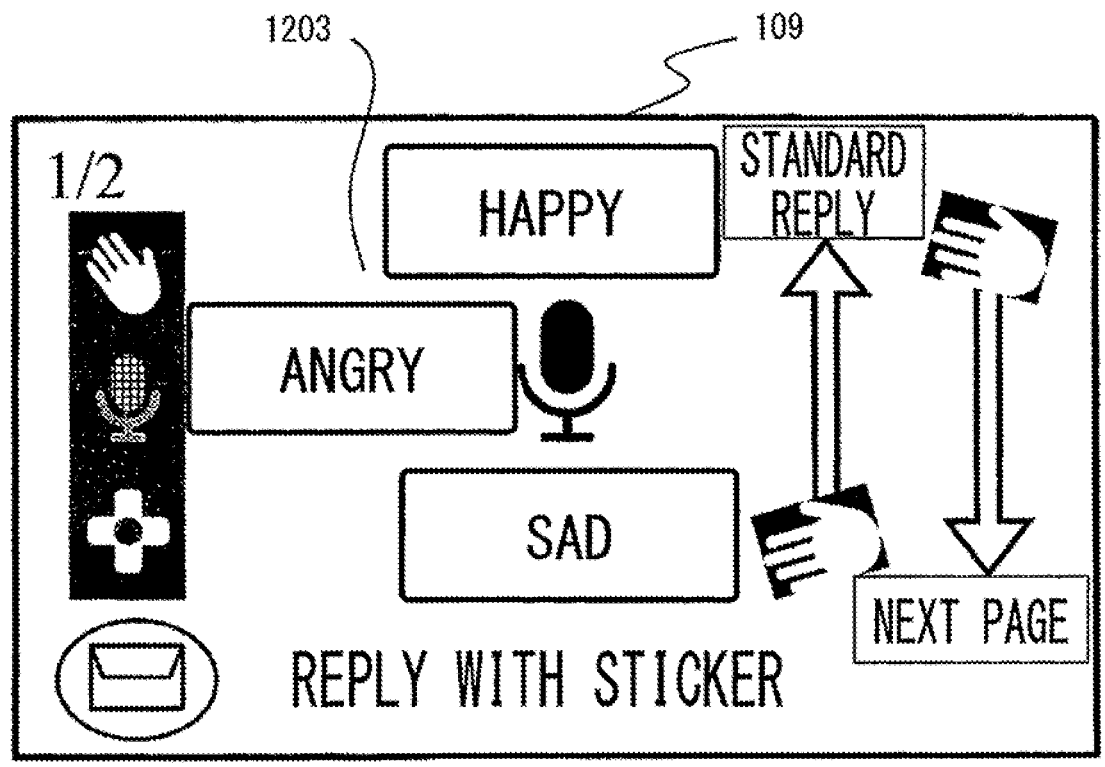
FIG. 12(d) An example of display upon the external display unit.

On the other hand, if the fact that voice recognition is to be performed is detected (i.e. if a voice recognition start switch is pressed or the like), then the system changes over to a screen like that shown in FIG. 12(d). The icon 1201 means that voice recognition is in the waiting state, and the display 1203 means that, by the driver speaking in correspondence to one of the legends, he can select the sticker corresponding thereto. If the result of performing voice recognition agrees with one of the options, then reply operation is performed with the corresponding sticker. While in the example shown in FIG. 12(d) only legends like "HAPPY" and so on corresponding to the icons are displayed, it would also be acceptable to arrange for the icon to be transmitted to be recognized at a glance by displaying the icons for transmission together with the legends. Since, when voice recognition is employed, the user is enabled to select the sticker that he wishes to be transmitted without removing either of his hands from the steering wheel, accordingly yet a further level of contribution to safe driving is provided.

Incidentally, with regard to these three types of operating means, it will be supposed that the operating means is changed over if start triggers for operations are detected, even in a state in which some operation is partway through. Moreover it will be supposed that, while the operating state is switch operation and voice recognition, a gesture action with an up and down hand gesture can also be received during this state. With the above arrangements, there is no limitation to the use of one operating means while the user is performing reply operation; the reply operating means can be freely selected according to the situation during driving, and according to the desire of the user. Moreover, when changing over between the various operating means, by presenting the user with information specifying with which operating means it is currently possible to perform actuation, and in what way operation may appropriately be performed, it is possible for the user to perform operation quickly and intuitively without going astray during operation.

Figure 12E:
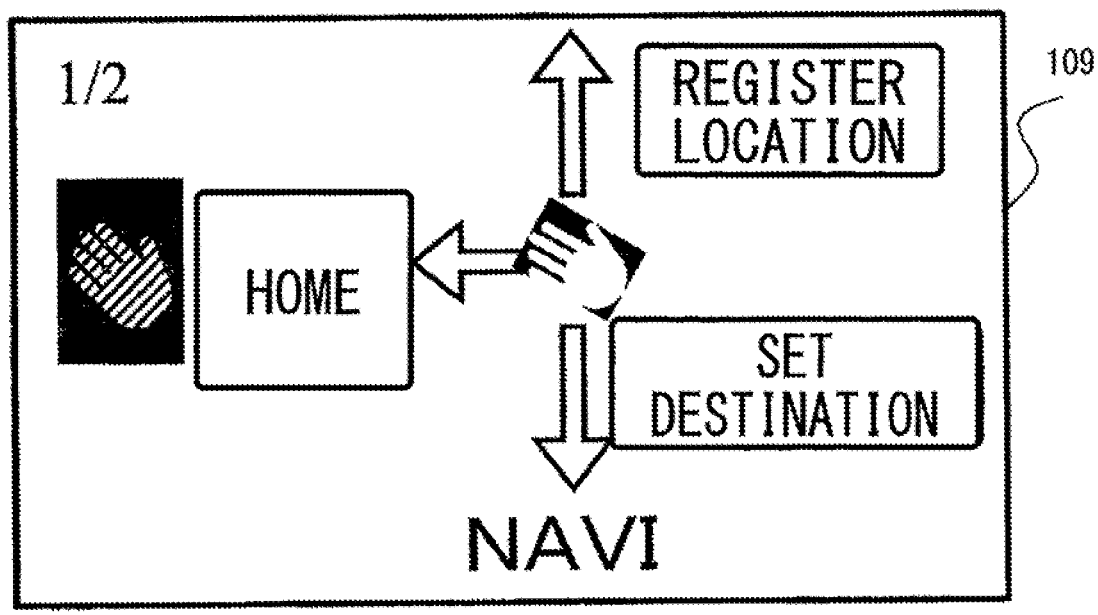
FIG. 12(e) An example of display upon the external display unit.
Figure 12F:
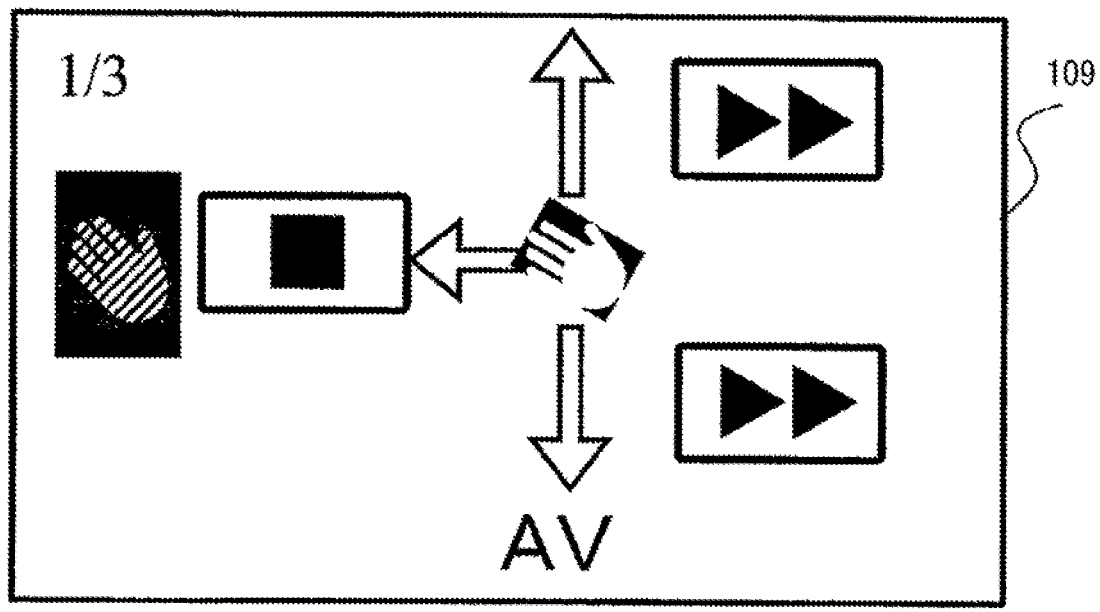
FIG. 12(f) An example of display upon the external display unit.
Figure 12G:
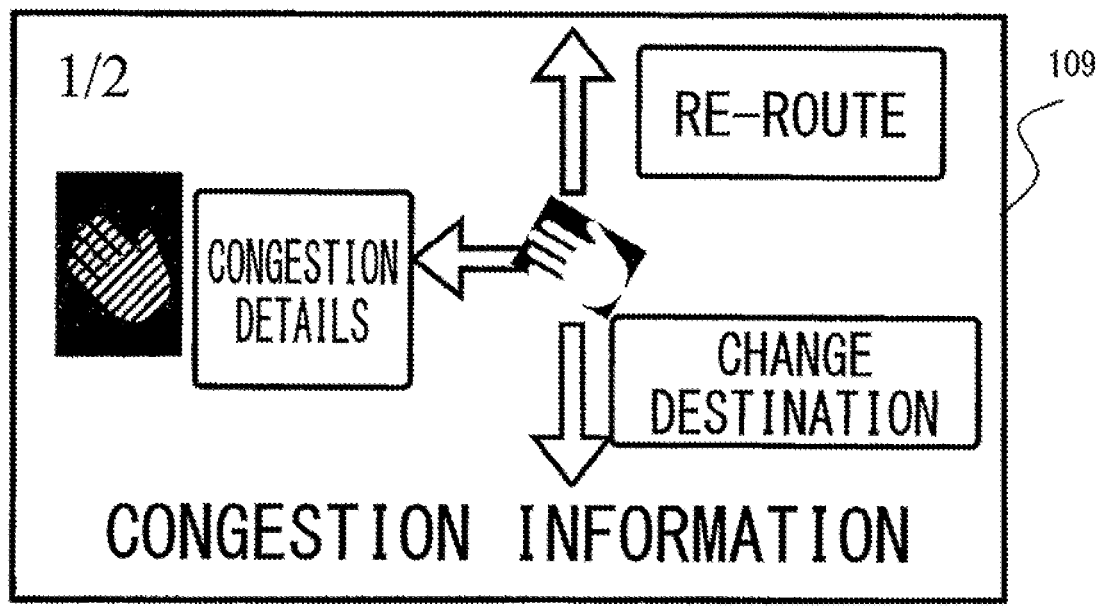
FIG. 12(g) An example of display upon the external display unit.

Furthermore, it would also be acceptable to arrange to change the operational details that can be actuated when the user has raised his hand, according to the operational state of the application by which the in-vehicle device is controlled. FIG. 12(e) shows an example in which, when there is no application other than navigation running in the background, operations related to navigation, such as setting a route to the driver's home, registering the ground point at the current position, setting a destination by voice, and so on, are presented as candidates for selection. Moreover, FIG. 12(f) shows an example in which, when the user has raised his hand during replay of music or the like, operation to stop the music, operation to change to the next tune, operation to skip to the previous tune, and so on, are presented as candidates for selection. And FIG. 12(g) shows an example in which, when the user has raised his hand during reception of congestion information or the like, operation to hear the details of congestion information, operation to perform re-routing, operation to change the destination, or the like are presented as candidates for selection. With the above arrangements, it becomes possible for the user to select operations of various types quickly, according to the state of the application by which the in-vehicle device is being controlled during driving.

As has been described above, with this in-vehicle device 101 according to the first embodiment of the present invention, the user is able to perform operation intuitively and also quickly, even though he is driving and continues to look forward. In concrete terms, the user can quickly perform changeover of the messenger application display, operation to skip through the messages, and so on, even while looking forward. Furthermore, when performing actuation to select from a plurality of options, he is able to select the desired option while checking the details of the candidates for selection, even while still looking in the forward direction. Yet further since, when the user is used to the mode of operation, he is able to choose from the options even while not looking at the display, accordingly it is possible for him to perform operation both more quickly and also in greater safety.

Embodiment #2

Explanation of the Structure

Figure 13:
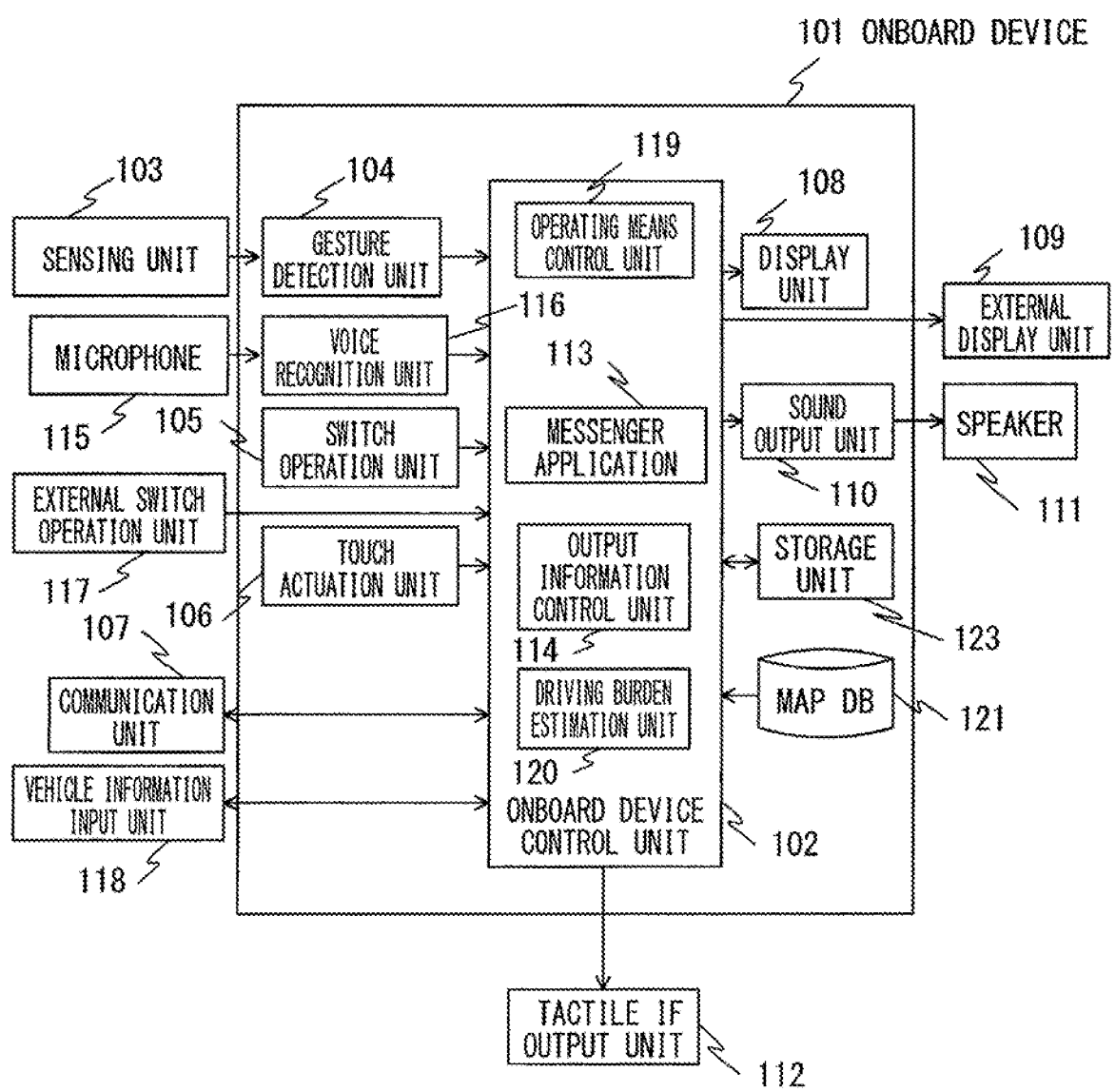
FIG. 13 A structural diagram of an in-vehicle device according to a second embodiment of the present invention.

FIG. 13 is a structural diagram of the in-vehicle device 101 of this embodiment. As compared to the structural diagram of FIG. 1, a vehicle information input unit 118, an operating means control unit 119, a driving burden estimation unit 120, and a map DB (data base) 121 are added. In the case of the vehicle information input unit 118, the operating means control unit 119, and the driving burden estimation unit 120, in the same way as described above, by performing calculations according to a program that is stored in the storage unit 123, the in-vehicle device controlling unit 102 provides the functions of this vehicle information input unit 118, this operating means control unit 119, and this driving burden estimation unit 120.

The vehicle information input unit 118 is a section that acquires information related to the vehicle while traveling; for example, it may be connected to the vehicle via a CAN (Control Area Network), and may acquire the vehicle speed, the accelerator opening amount, the brake stepping on amount, the state of the indicator signals, the steering angle, and so on.

The operating means control unit 119 controls which operating inputs from the gesture detection unit 104, from the voice recognition unit 116, and from switch operation units of various types are to be reflected.

The driving burden estimation unit 120 estimates what is the level of the driving burden currently being imposed upon the user by driving operation. For example, in addition to input signals of various types from the vehicle information input unit 118 described above, this driving burden estimation unit 120 may consolidate information inputted from the communication unit 107 (such as map information the type of road upon which the vehicle is traveling, the distance from the vehicle in front, and so on), and may define the level of driving burden in four stages ("NONE", "LOW", "MEDIUM", and "HIGH"). "NONE" is a state when the vehicle is stopped, for example when waiting at a signal or the like, or during traveling such as automatic driving when no special operation by the driver needs to be performed, as with ACC (Adaptive Cruise Control) or the like; "LOW" is when the vehicle is traveling along a straight road with no obstructions at the side, or the like; "MEDIUM" is a traveling state when operation of the steering wheel is constantly required, as when traveling at a fixed speed or higher or when turning right or left at an intersection or the like; and "HIGH" is a state when some very important driving operation is required, such as when an accident is imminent or the like.

And the map DB 121 is a data base that stores map information.

Explanation of Operation

The operation of the in-vehicle device 101 according to this embodiment will now be described in detail. The fundamental operation is the same as described in connection with the first embodiment, but, in this embodiment, the distinguishing feature is that the operation is also controlled according to the output of the driving burden estimation unit 120. In this in-vehicle device control unit 102, for the various driving burden levels outputted by the driving burden estimation unit 120, which operating means can be actuated and which display details are to be displayed at this time are defined in advance. The tables of FIG. 14 show these definitions.

FIG. 14(a) is a table showing whether or not each operating means can be used at each driving burden level. If the driving burden level is "NONE" or "LOW", then reply operation can be performed with all of the operating means described in connection with the first embodiment. On the other hand, if the driving burden level is "HIGH" then all of these operations are prohibited. And, if the driving burden level is "MEDIUM", then display of the operation guide for hand raising and subsequent selection of options by gesture action are prohibited. This is because the operation of the driver raising his hand is an operating method that compels one-handed driving, and therefore this action is prohibited in the case of a situation in which the driver's full attention must be concentrated upon the operation of driving.

Figure 15A:
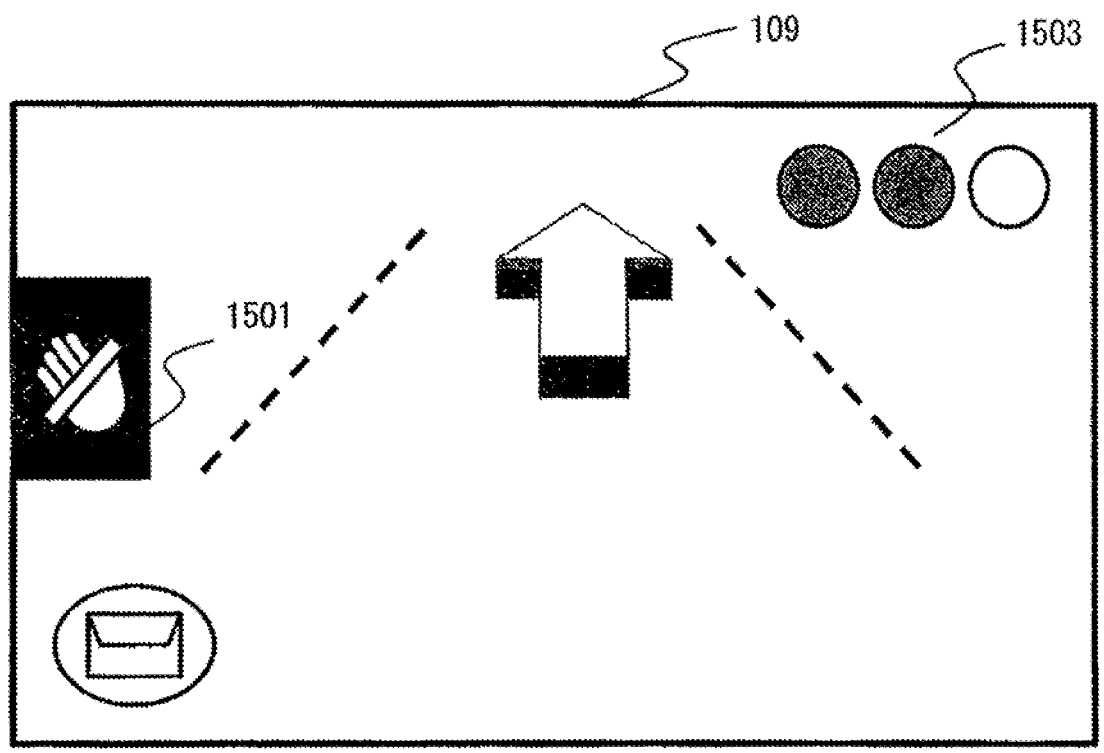
FIG. 15(a) Another example of display upon the external display unit.

The current driving burden level is displayed upon the external display unit 109 of this embodiment by the icons 1503 of FIG. 15(a). In this figure, these icons mean the state in which the driving burden level is "MEDIUM", and the fact that the user cannot perform operation by approaching his hand is shown by a display like the icon 1501, which means that operation by hand raising is prohibited. Furthermore, if in this state it has been detected that the user has raised his hand, then, along with changing the display or the color of the icon 1501 so as to accentuate it, also a warning sound or a warning voice or the like is outputted, so that the user is urged to stop raising his hand immediately. By this sort of control being performed, along with the user being able to ascertain the current situation with regard to the driving burden level upon him, it is also possible to prevent him, as much as possible, from undesirably removing one of his hands from the steering wheel for any substantial period of time in order to display the operation guide, even though steering wheel actuation is required at this time. On the other hand, in this state, even though the driving burden level is "MEDIUM", composition of a reply by voice recognition without hand use and the use of a hand waving gesture for completion thereof by an instantaneous action are enabled.

Figure 15B:
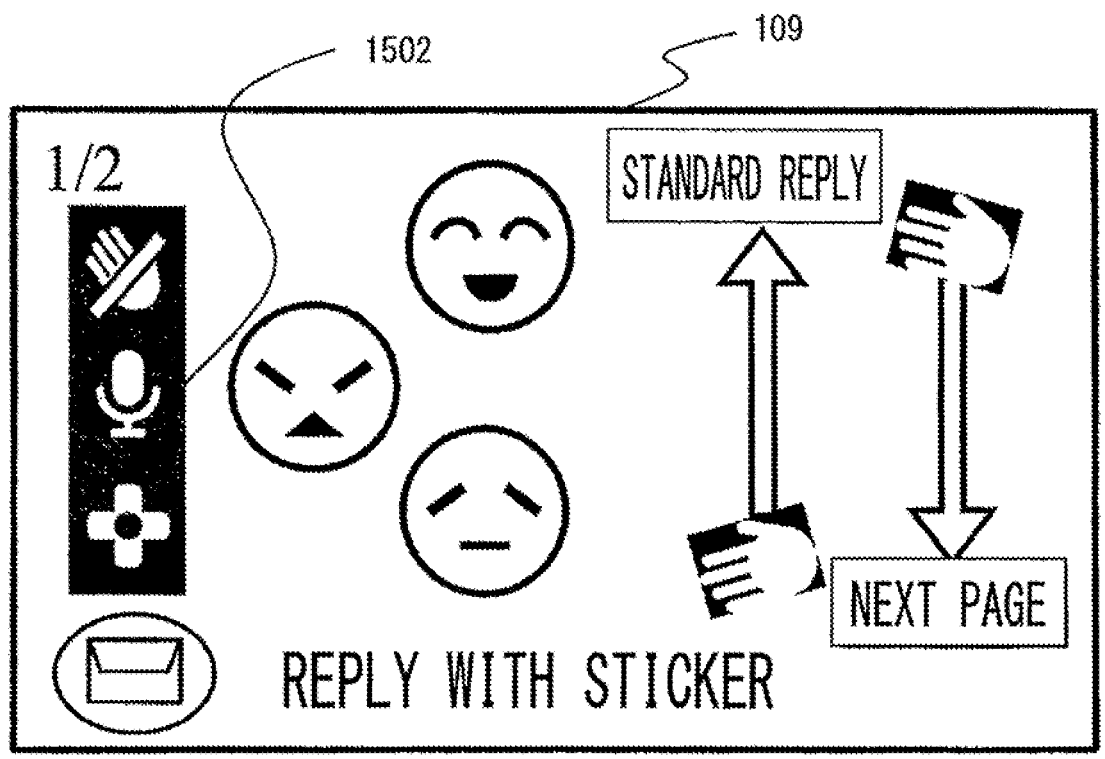
FIG. 15(b) An example of display upon the external display unit.

Furthermore if, in the state in which the driving burden level is "NONE" or "LOW", the driving burden level changes over to "MEDIUM" while a reply operation is partway through after hand raising has been performed, then selection operation for options by switch operation or by voice operation is still permitted, but is limited to this reply operation which is partway through. At this time, as shown in FIG. 15(b), among the icons for the three types of operating means, it is shown that choice of operating options by hand raising and by gestures is prohibited.

FIG. 14(b) is a table defining the relationship between the driving burden level and the details outputted upon the center display. First, if the driving burden level is "NONE", then the messenger application 113 displays all the text of a message. Moreover, when performing reply operation after having performed fundamental operation by touching an operation icon upon the screen or the like, all the options for sticker candidates and so on are displayed. And, if the driving burden level is "LOW" or "MEDIUM", then the text of a message is not displayed, but only the name of the caller who sent the message is displayed. Moreover, the operation system that uses touch actuation display is also not displayed.

Figure 16A:
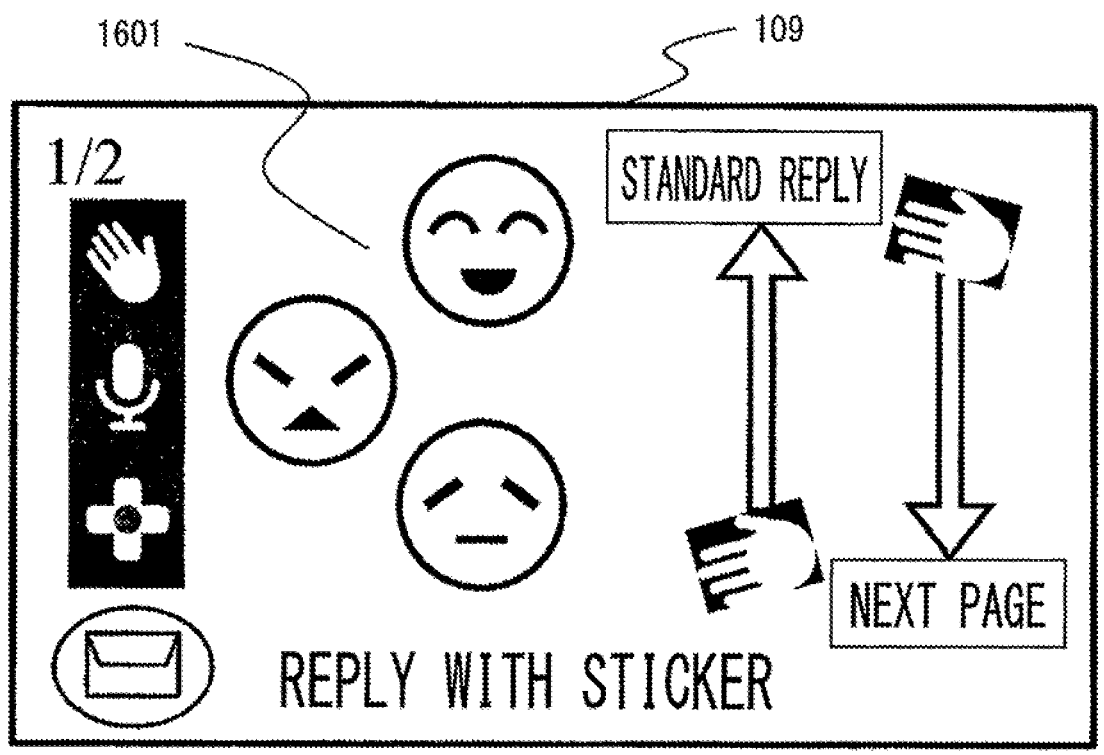
FIG. 16(a) An example of display upon the display unit.
Figure 16B:
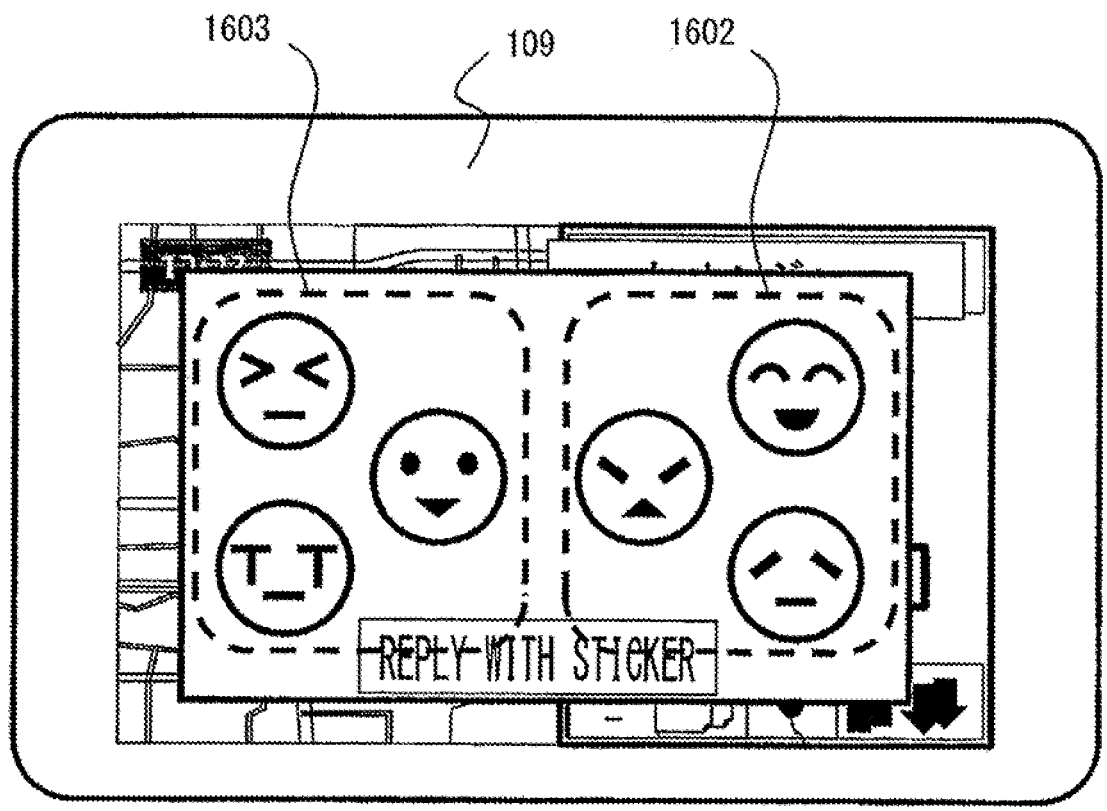
FIG. 16(b) An example of display upon the display unit.

Furthermore, if the driving burden level is "HIGH", then the screen of the messenger application 113 is also eliminated, and in this state an appropriate warning message (for example, "Keep a safe distance between cars!" or the like) is displayed. It should be understood that, if the driving burden level is "LOW" or "MEDIUM", and if the driving burden level changes over to "NONE" while hand raising has been performed and a reply operation is partway through being performed, then performance of actuation by touch actuation upon the center display is also enabled, in consideration of the state of the operation guide that is being displayed upon the HUD. For example, in the state in which replying with a sticker can be performed upon the HUD as shown in FIG. 16(a), while keeping the details of sticker candidates and information about their arrangement the same, these details may also be displayed upon the center display, as shown in FIG. 16(b).

In concrete terms, in the state in which the details of the sticker candidates 1601 upon the HUD and their screen arrangement relationship are maintained, they are displayed upon the center display, as shown by 1602. Moreover, in order to make it easy for the driver to perform actuation by following the details at 1602, they are arranged upon the screen as displaced toward the side of the driver, so that he is enabled to perform selection of a sticker by touch operation. Furthermore, as shown by 1603, the remaining sticker candidates are arranged upon the screen in a position remote from the side of the driver. And conversely if, in the state in which the vehicle is stopped and actuation upon the center display is partway through being performed, the driving burden level has changed over to "LOW" or "MEDIUM" due to the vehicle starting off from rest, then display of options and selection operation on the center display are stopped, and, while keeping the reply method as it was partway through operation, the system transitions to the step S315 in FIG. 3(a), and actuation is continued without alteration.

FIG. 14(c) is a table defining the relationship between the driving burden level and the details outputted upon the HUD. First, if the driving burden level is "NONE" or "LOW", then when reading out a message the caller name is displayed, and moreover, when performing reply operation, the operation guide is displayed. And, if the driving burden level is "MEDIUM", then a display is provided to the effect that operation by hand raising is prohibited, and the display of the operation guide continues to be displayed only if the driving burden level has changed from "LOW" to "MEDIUM". And, if the driving burden level is "HIGH", then in this state an appropriate warning message (for example, "Keep a safe distance between cars!" or the like) is displayed.

And FIG. 14(d) is a table defining the relationship between the driving burden level and the sound output from the speaker. If the driving burden level is any from "NONE" to "MEDIUM", then at that time point operating sounds or voice readouts are outputted. But if the driving burden level is "HIGH", then it will be supposed that only warning sounds are outputted. It should be understood that, even if a message is being read out, this output is also stopped. A message reading of which has been stopped is restarted after the driving burden level has dropped, and this message is read out from the beginning again.

It should be understood that it would also be possible to arrange to change the algorithm for detecting hand raising by the user and the method of feedback, according to the driving burden level. For example, if when the driving burden level is "LOW" the user has raised his hand for 0.5 seconds or more, then this may be taken as detection of hand raising, while this may be changed to detection when the user has raised his hand for 2 seconds or more if the driving burden level is "NONE". Furthermore, if the driving burden level is "NONE", then feedback for hand raising by output of sound may be discontinued. Due to the above it is possible to prevent erroneous detection being performed by the hand raising detection algorithm, by the operation of which it has been considered that the driver is capable of performing actuation quickly during traveling and moreover without diverting his line of sight from straight ahead, due to some action other than hand raising operation such as touch operation or the like, in consideration of the fact that, while the vehicle is stopped, touch operation and a certain lack of attention are permissible.

As has been explained above, with the in-vehicle device 101 according to the second embodiment of the present invention, in addition to the user being able to perform operation intuitively and also quickly even while still looking straight ahead during driving, and along with the user being able to perform actuation by employing a wider variety of means and being able to receive a large amount of information when he has considerable freedom as when the vehicle is stopped or the like, also, in the case of a situation in which he must concentrate upon driving operation, he is prevented from undesirably directing his attention at anything other than driving operation due to such other operations; and accordingly it is possible for safe driving to be performed.

It should be understood that while, in all of the embodiments described above, in-vehicle devices have been explained by way of example, the present invention should not be considered as being limited thereby; it would also be possible to apply the present invention to a personal computer, to a digital signage, to a construction machine, to an aircraft, to an operator monitoring device, or to any device that has a display unit and an actuation means.

The content of the disclosure of the following application, upon which priority is claimed, is hereby incorporated herein by reference:

Japanese Patent Application 2014-138237 of 2014 (filed on Jul. 4, 2014).

REFERENCE SIGNS LIST

101: in-vehicle device
102: in-vehicle device control unit
103: sensing unit
104: gesture detection unit
105: switch operation unit
106: touch actuation unit
107: communication unit
108: display unit
109: external display unit
110: sound output unit
111: speaker
112: tactile IF output unit
113: messenger application
114: output information control unit
115: microphone
116: voice recognition unit
117: external switch operation unit
118: vehicle information input unit
119: operating means control unit
120: driving burden estimation unit
121: map DB
123: storage unit

The invention claimed is:

1. A device for inputting information into an in-vehicle computer that improves vehicle safety, the device comprising:
a user sensor that detects gestures by a user;
a communication interface that is communicatively coupled to vehicle sensors, wherein the vehicle sensors determine an operating status of a vehicle;
a display; and
a processor communicatively coupled to the user sensor, the communication interface and the display, wherein the processor:
receives, using the communication interface, the operating status of the vehicle from the vehicle sensors,
determines a burden level of the user based on the operating status of the vehicle,
selects a set of allowed gestures and a set of prohibited gestures from a plurality of gestures based on the burden level determined, wherein the plurality of gestures includes a hand waving up and down, a hand waving left and right, and a hand raising,
identifies, using the user sensor, a first gesture performed by the user,
determines if the first gesture is within a first region and on a condition that the first gesture is performed within the first region, generates a notification to the user, such that the user moves to a second region and performs the first gesture again,
compares the first gesture to the set of allowed gestures and the set of prohibited gestures,
on a condition that the first gesture is included in the set of prohibited gestures, generates a warning to the user, wherein the warning includes at least one of a warning sound or a warning voice; and
on a condition that the first gesture is included in the set of allowed gestures:
determines an indication of whether the first gesture has continued for a predetermined time,
on a condition the first gesture has continued for the predetermined time:
displays, using the display, a plurality of candidates for selection in association with gestures for operation,
determines a selection gesture from the set of allowed gestures,
identifies, using the user sensor, a second gesture performed by the user,
compares the second gesture to the selection gesture, and
on a condition that the second gesture matches the selection gesture, selects a particular candidate from the plurality of candidates as the input to the in-vehicle computer,
wherein the second region is a region closer to the user sensor than the first region,
wherein a number of options displayed upon the display are changed and gesture actions corresponding to each of the number of options are changed based on an attitude in which the user has raised the hand.

2. The device according to claim 1, wherein:
the processor identifies the second gesture before the plurality of candidates are displayed.

3. The device according to claim 1, wherein:
the display is one of a plurality of the displays in the vehicle, and
the processor determines a particular display to display the plurality of candidates based on the burden level.

4. The device according to claim 1, further comprising:
a memory that stores whether the vehicle is a left hand drive vehicle or a right hand drive vehicle, wherein:
the processor changes the number of options displayed upon the display, and the gesture actions corresponding to the options, according to information stored in the memory and the attitude.

5. The device according to claim 1, wherein the processor further:
after having displayed the plurality of candidates for selection upon the display, detects, using the user sensor, that the user has ceased to raise a hand, causes a message showing that the candidates for selection can be changed and a gesture action corresponding to the message to be displayed; and changes the candidates for selection, when the selection gesture is detected.

6. The device according to claim 1, further comprising:

an audio input that acquires voice input from the user, wherein the processor further:

receives, using the audio input, the particular candidate from the plurality of candidates based on a command spoken by the user.

7. The device according to claim 1, wherein the processor further:

display the plurality of the candidates for selection until the particular candidate is determined, or until a certain time period has elapsed.

\* \* \* \* \*